(12) United States Patent
Davydov et al.

(10) Patent No.: US 10,849,115 B2
(45) Date of Patent: Nov. 24, 2020

(54) DOWNLINK CONTROL CHANNEL DESIGN IN NEW RADIO SYSTEMS

(71) Applicant: Intel IP Corporation, Santa Clara, CA (US)

(72) Inventors: Alexei Davydov, Nizhny Novgorod (RU); Debdeep Chatterjee, San Jose, CA (US); Hong He, Sunnyvale, CA (US); Gang Xiong, Portland, OR (US); Hwan-Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 16/126,260

(22) Filed: Sep. 10, 2018

(65) Prior Publication Data

US 2019/0045490 A1    Feb. 7, 2019

(51) Int. Cl.
*H04W 72/04* (2009.01)
*H04W 76/27* (2018.01)
(Continued)

(52) U.S. Cl.
CPC ......... *H04W 72/042* (2013.01); *H04L 1/0069* (2013.01); *H04L 5/0044* (2013.01);
(Continued)

(58) Field of Classification Search
CPC ....... H04L 1/0013; H04L 1/0067–0069; H04L 5/0044–0057; H04L 5/0091–0094;
(Continued)

(56) References Cited

U.S. PATENT DOCUMENTS 8,989,208 B2    3/2015  Chen et al.
2018/0227922 A1*   8/2018  Lee ................... H04W 72/0406
(Continued)

FOREIGN PATENT DOCUMENTS

WO    2018/131857 A1    7/2018

OTHER PUBLICATIONS

International Search Report and Written Opinion dated Dec. 17, 2019 for PCT Application PCT/US2019/047851.
(Continued)

*Primary Examiner* — Pao Sinkantarakorn
(74) *Attorney, Agent, or Firm* — Eschweiler & Potashnik, LLC

(57) ABSTRACT

An apparatus configured to be employed in a gNodeB associated with a new radio (NR) communication system that support resource sharing between NR physical downlink shared channel (PDSCH) and NR physical downlink control channel (PDCCH) is disclosed. The apparatus comprises a processing circuit configured to generate a PDSCH dynamic rate matching resource set configuration signal comprising information on one or more overlap resource sets, wherein each the one or more overlap resource sets comprises time-frequency resources on which any overlapping PDSCH may or may not be mapped, based on an indication provided within a PDSCH rate matching indicator signal. The apparatus further comprises a radio frequency (RF) interface, configured to provide the generated PDSCH dynamic rate matching resource set configuration signal, to an RF circuitry, in order to subsequently provide the PDSCH dynamic rate matching resource set configuration signal to a user equipment (UE), in order to enable the UE to identify the one or more overlap resource sets.

20 Claims, 12 Drawing Sheets

(51) Int. Cl.
  H04L 5/00      (2006.01)
  H04W 28/22    (2009.01)
  H04L 1/00      (2006.01)
(52) U.S. Cl.
  CPC .......... H04L 5/0053 (2013.01); H04W 28/22 (2013.01); H04W 72/0446 (2013.01); H04W 76/27 (2018.02)
(58) Field of Classification Search
  CPC .......... H04W 72/042; H04W 72/0446; H04W 72/0493; H04W 72/1273; H04W 72/1289
  See application file for complete search history.

(56) References Cited

U.S. PATENT DOCUMENTS

2019/0342030 A1* 11/2019 Hosseini .............. H04L 5/0046
2020/0022168 A1* 1/2020 Xu ....................... H04L 5/0053

OTHER PUBLICATIONS

"On remaining issues of rate matching." Source: ZTE, Sanechips. Agenda item: 7.3.5. 3GPP TSG RAN WG1 Meeting AH 1801, Vancouver, Canada, Jan. 22-26, 2018. R1-1800141.
"SPDCCH demodulation requirements for sTTI." Source: Ericsson. Agenda Item: 6.21.7. 3GPP TSG-RAN WG4 Meeting #86, Athens, Greece, Feb. 26-Mar. 2, 2018. R4-1802368.
"Summary of offline on maintenance related to rate-matching in NR." Source: Nokia, Nokia Shanghai Bell. Agenda Item: 7.1.3.5. 3GPP TSG-RAN WG1 #94, Busan, South Korea, May 21-25, 2018. R1-1809846.
"UE Demodulation performance requirements for sTTI and sPT." Source: Qualcomm Incorporated. Agenda item: 6.21.7. 3GPP TSG-RAN WG4 Meeting #86, Athens, Greece, Feb. 26-Mar. 2, 2018. R4-1801991.
Lin, Xingqin et al. "5G New Radio: Unveiling the Essentials of the Next Generation Wireless Access Technology." 8 pages, Year: 2018.
"The LTE Network Architecture A comprehensive tutorial." Strategic White Paper. Alcatel-Lucent . 2009. 26 pages.
Campos, Javier. Understanding the 5G NR Physical Layer. Keysight Technologies. Nov. 1, 2017. 111 pages.
"5G/NR—Search Space." 5G—Waveform Candidate—5G/ShareTechnote. http://www.sharetechnote.com/html/5G/5G_SearchSpace.html. 3 pages, Retrieved on Sep. 10, 2018.
"PDCCH Candidate and Search Space." LTE Quick Reference. ShareTechnote. http://www.sharetechnote.com/html/Handbook_LTE_PDCCH_Candidate.html. 1 page, Retrieved on Sep. 10, 2018.
"Parameters for CORESET." 5G/NR—Resource Allocation Unit. 5G—Waveform Candidate—5G/ShareTechnote. http://www.sharetechnote.com/html/5G/5G_ResourceAllocationUnit.html. 3 pages, Retrieved on Sep. 10, 2018.
"Tayal's way to learn LTE." All about PDCCH and CCE allocation/ Tayal's way to learn LTE. http://nitintayal-lte-tutorials.blogspot.com/2013/05/all-about-pdcch-and-cce-allocation.html. 12 pages, Retrieved on Sep. 10, 2018.

* cited by examiner

DOWNLINK CONTROL CHANNEL DESIGN IN NEW RADIO SYSTEMS

FIELD

The present disclosure relates to new radio (NR) systems, and in particular, to a system and method for downlink control channel design in NR systems.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. A range of new applications such as connected industrial plants or vehicular communications, remote surgery is characterized with the need for reliable real-time communication with high requirements on latency. In general, NR will evolve based on 3GPP LTE-Advanced with additional potential new Radio Access Technologies (RAT) to enrich people lives with better, simple and seamless wireless connectivity solutions. NR will enable everything connected by wireless and deliver fast, rich contents and services.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
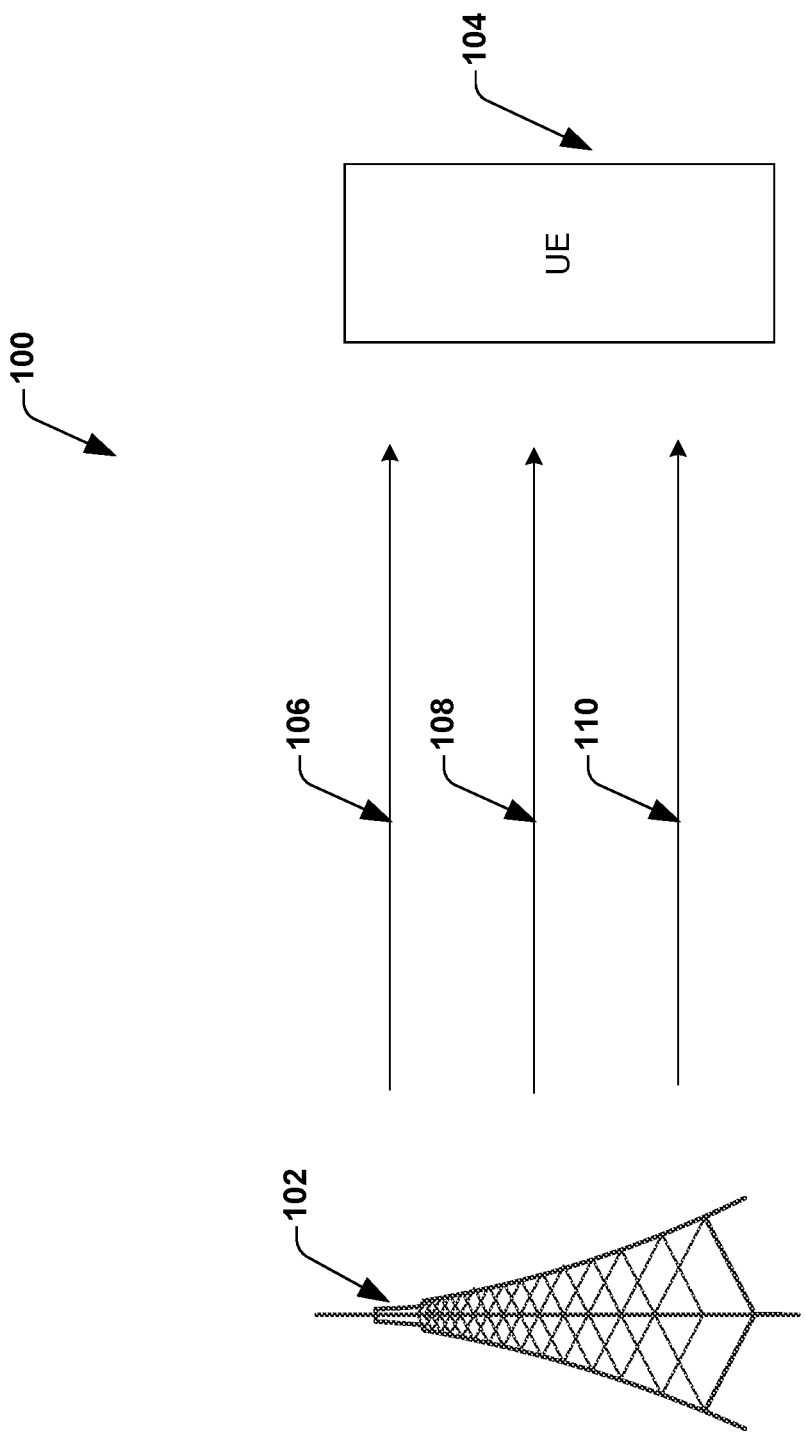
FIG. 1 illustrates a simplified block diagram of a new radio (NR) communication system that support resource sharing between NR physical downlink shared channel (PDSCH) and NR physical downlink control channel (PDCCH), according to one embodiment of the disclosure.

In one embodiment of the disclosure, an apparatus configured to be employed in a next generation Node B (gNodeB) associated with a new radio (NR) communication system is disclosed. The apparatus comprises a processing circuit configured to generate a physical downlink shared channel (PDSCH) dynamic rate matching resource set configuration signal comprising information on one or more overlap resource sets. In some embodiments, each the one or more overlap resource sets comprises time-frequency resources on which any overlapping PDSCH may or may not be mapped, based on an indication provided within a PDSCH rate matching indicator signal. The apparatus further comprises a radio frequency (RF) interface, configured to provide the generated PDSCH dynamic rate matching resource set configuration signal, to an RF circuitry, in order to subsequently provide the PDSCH dynamic rate matching resource set configuration signal to a user equipment (UE), in order to enable the UE to identify the one or more overlap resource sets.

In one embodiment of the disclosure, an apparatus configured to be employed in a user equipment (UE) associated with a new radio (NR) communication system is disclosed. The apparatus comprises a radio frequency (RF) interface, configured to receive a physical downlink shared channel (PDSCH) dynamic rate matching resource set configuration signal, from a next generation Node B (gNodeB) associated therewith, wherein the PDSCH dynamic rate matching resource set configuration signal comprises information on one or more overlap resource sets. In some embodiments, each of the one or more overlap resource sets comprises time-frequency resources on which any overlapping PDSCH may or may not be mapped, based on an indication provided within a PDSCH rate matching indicator signal. In some embodiments, the apparatus further comprises a processing circuit configured to process the PDSCH dynamic rate matching resource set configuration signal, in order to identify the one or more overlap resource sets.

In one embodiment of the disclosure, an apparatus configured to be employed in a next generation Node B (gNodeB) associated with a new radio (NR) communication system is disclosed. The apparatus comprises a processing circuit configured to configure a shortened physical downlink control channel (SPDCCH) resource set comprising a plurality of time-frequency resources, wherein the plurality of time-frequency resources is grouped into a plurality of short resource element groups (SREGs) and wherein each of the plurality of SREGs is identified by a corresponding SREG number. In some embodiments, the processing circuit is further configured to configure a plurality of shortened control channel elements (SCCEs) identified by a respective plurality of SCCE numbers within the SPDCCH resource set, each SCCE comprising a set of SREGs of the plurality of SREGs, based on grouping the plurality of SREGs by utilizing an information of the resource signal type associated with the SPDCCH resource set, in accordance with a predefined SCCE relation. In addition, in some embodiments, the processing circuit is further configured to configure one or more SPDCCH candidates within the SPDCCH resource set, each SPDCCH candidate comprising one or more SCCEs of the plurality of SCCEs, based on an information of the resource signal type and an aggregation level associated with the SPDCCH resource set, in accordance with a predefined SPDCCH candidate relation. In some embodiments, the one or more SPDCCH candidates are to be utilized by the gNodeB to transmit downlink control information (DCI) to a user equipment (UE) associated therewith for shortened transmission time interval (STTI) operations.

In one embodiment of the disclosure, an apparatus configured to be employed in a user equipment (UE) associated with a new radio (NR) communication system is disclosed. The apparatus comprises a processing circuit configured to determine one or more shortened physical downlink control channel (SPDCCH) candidates to be utilized by the UE to receive a downlink control information (DCI) from a next generation Node B (gNodeB) associated therewith for shortened transmission time interval (STTI) operations, based on an information of an aggregation level of an associated SPDCCH resource set. In some embodiments, the processing circuit is further configured to determine one or more shortened control channel elements (SCCEs) associated with each of the one or more SPDCCH candidates, based on an information of a reference signal type and the aggregation level of the associated SPDCCH resource set, in accordance with a predefined SPDCCH candidate relation. In addition, in some embodiments, the processing circuit is further configured to determine a set of shortened resource element groups (SREGs) associated with each of the one or more SCCEs associated with the one or more SPDCCH candidates, based on an information of the reference signal type the associated SPDCCH resource set, in accordance with a predefined SCCE relation, in order to enable the UE to monitor the one or more SPDCCH candidates to receive the DCI.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from conte8, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from conte8 to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, NR is designed to enable everything connected by wireless and deliver fast, rich contents and services. In particular, NR is intended to provide reliable real-time communication with very low latency. In order to enable reliable communication in 5G, various physical channels (e.g., control channels, transport channels etc.) are defined. In particular, a physical downlink control channel (PDCCH) is defined that comprises a control channel that carries control information about the data being transmitted on a current subframe and information about the resources which a user equipment (UE) need to use for sending uplink data. In some embodiments, it is mandatory for the UE to decode the PDCCH successfully for sending data to a next generation Node B (gNodeB) or receive data from the gNodeB. In some embodiments, the PDCCH carries a message called downlink control information (DCI) which includes resource assignments for a UE or a group of UEs. Further, a physical downlink data channel (PDSCH) is defined that comprises a transport channel used for the transmission of user data, dedicated control and user-specific higher layer information and downlink system information.

With the increased demand for reliable communication, efficient utilization of resources allocated for the various physical channels is important. In order to enable efficient utilization of the resources allocated for the physical channels, in one embodiment, a system and a method that enables semi-static and dynamic sharing of physical resources between PDCCH and PDSCH in NR is proposed herein. Further, in order to explore the viability of using radio technology for applications that have high requirements on latency, in some embodiments, a shortened transmission time interval (STTI) operation that utilizes an STTI is utilized. The sTTI is implemented by splitting a 1 ms subframe or TTI with duration shorter than a subframe. In some embodiments, the STTI is referred to as a mini-slot. The design of shortened physical downlink control channel (SPDCCH) search space for sTTI operations is important with respect to overhead, efficiency, reliability, robustness, and complexity. In some embodiments, the SPDCCH search space indicates a set of possible locations where the SPDCCH candidates may be located within the STTI. Therefore, in another embodiment, a method and a system for SPDCCH search space design that enables SPDCCH candidates to provide improved SPDCCH performance is proposed.

FIG. 1 illustrates a simplified block diagram of a new radio (NR) communication system or a Long Term Evolution (LTE) or LTE-Advanced system 100 that support resource sharing between NR or LTE physical downlink shared channel (PDSCH) and NR or LTE physical downlink control channel (PDCCH), according to one embodiment of the disclosure. In some embodiments, NR/LTE communication system 100 comprises 5G systems. The NR/LTE communication system 100 comprises a new generation Node B (gNodeB) or evolved Node B (eNB) 102 and a user equipment 104 configured to communicate with one another. However, in other embodiments, the NR or LTE communication system 100 may comprise a plurality of gNodeBs/eNBs and UEs configured to communicate with one another. Hereinafter, unless explicitly mentioned, the term of "gNodeB" represents both "gNodeBs and eNBs or eNodeBs" without loss of the generality. In some embodiments, the NR/LTE communication system 100 is configured to support semi-static and dynamic sharing of physical resources between NR/LTE PDCCH and NR/LTE PDSCH. In some embodiments, the gNodeB 102 is configured to generate a rate-matched resource set configuration signal 106 (e.g., PDSCH-Config for each bandwidth part (BWP) or ServingCellConfigCommon for a cell), comprising information on a plurality of rate-matched resource sets, rateMatchPatternToAddModList (each rate-matched resource set identified by a RateMatchPattern), and provide the rate-matched resource set configuration signal 106 to the UE 104, in order to enable the UE 104 to identify the plurality of rate-matched resource sets, or configure the UE 104 with the plurality of rate-matched resource sets. In some embodiments, the RateMatchPattern when provided by PDSCH-Config or within a serving cell when provided by ServingCellConfigCommon, a pair of reserved resources with numerology provided by higher layer parameter subcarrierSpacin given by RateMatchPattern when configured per serving cell or by numerology of associated BWP when configured per BWP. In some embodiments, the plurality of rate-matched resource sets comprises time-frequency resources (e.g., resource elements) on which any overlapping physical downlink shared channel (PDSCH) may not be mapped. In some embodiments, the plurality of rate-matched resource sets are indicated within the rate-matched resource set configuration signal 106 by a resource block (RB) level bitmap (higher layer parameter resourceBlocks given by RateMatchPattern) with 1RB granularity and a symbol level bitmap spanning one or two slots (higher layer parameters symbolsInResourceBlock given by RateMatchPattern) for which the reserved RBs apply. In some embodiments, a bit value equal to 1 in the RB and symbol level bitmaps indicates that the corresponding resource is not available for PDSCH. For each pair of RB and symbol level bitmaps, a UE may be configured with a time-domain pattern (higher layer parameter periodicityAndPattern given by RateMatchPattern), where each bit of periodicityAndPattern corresponds to a unit equal to a duration of the symbol level bitmap, and bit value equal to 1 indicates that the pair is present in the unit. In some embodiments, the plurality of rate-matched resource sets comprises a control resource set (CORESET). In some embodiments, CORESET comprises predefined resource sets configured to carry NR PDCCH. In such embodiments, the CORESET is identified within the rate-matched resource set configuration signal 106 by using a frequency domain resource of a CORESET with controlResourceSetId and time domain resource determined by the higher layer parameters monitoringSlotPeriodicityAndOffset, duration and monitoringSymbolsWithinSlot of search-space-sets configured by SearchSpace and time domain resource of search-space-set zero configured by pdcch-ConfigSIB1 or searchSpaceZero associated with the CORESET with a controlResourceSetId. as well as CORESET duration configured by ControlResourceSet with controlResourceSetId. In some embodiments, the UE 104 is configured to receive and process the rate-matched resource set configuration signal 106, in order to identify the one or more rate-matched resource sets.

In some embodiments, the gNodeB 102 is further configured to generate a physical downlink shared channel (PDSCH) dynamic rate matching resource set configuration signal 108, comprising information on one or more overlap resource sets (given by higher layer parameters rateMatchPatternGroup1 and rateMatchPatternGroup2), and provide the PDSCH dynamic rate matching resource set configuration signal 108 to the UE 104, in order to enable the UE 104 to identify the one or more overlap resource sets, or configure the UE 104 with the one or more overlap resource sets. In some embodiments, each the one or more overlap resource sets comprises time-frequency resources (e.g., resource elements) on which any overlapping PDSCH may or may not be mapped, based on an indication provided within a PDSCH rate matching indicator signal 110. In other words, the one or more overlap resource sets comprises time-frequency resources on which any overlapping PDSCH may be dynamically mapped based on an indication received via further signaling (e.g., layer 1 signaling). In some embodiments, the PDSCH dynamic rate matching resource set configuration signal 108 comprises a bitmap wherein each bit identifies an overlap resource set and provides an indication that the corresponding overlap resource set can be reused for PDSCH mapping subject to further signaling. In some embodiments, the length of the bitmap can be corresponding to the length of the rate-matched resource sets indicated in the rate-matched resource set configuration signal 106 or could be equal to a maximum length depending on maximum number of rate-matched resource sets that can be configured in the rate-matched resource set configuration signal 106. In one example embodiment, the configured group rateMatchPatternGroup1 or rateMatchPatternGroup2 contains a list of RB and symbol level resource set indices forming a union of resource-sets (i.e., the one or more overlap resource sets) not available for PDSCH dynamically if a corresponding bit of a Rate matching indicator field of DCI format 1_1 scheduling the PDSCH (e.g., PDSCH rate matching indicator signal 110) is equal to 1. The REs corresponding to the union of configured RB-symbol level resource-sets that are not included in either of the two groups are not available for PDSCH scheduled by DCI format 1_1.

In some embodiments, a UE's own CORESET or a CORESET configured to the UE is included within the one or more overlap resource sets (given by higher layer parameters rateMatchPatternGroup1and rateMatchPatternGroup2) associated with the PDSCH dynamic rate matching resource set configuration signal 108. In the embodiments described throughout the disclosure, the term UE's own CORESET refers to a CORSET configured to the UE. In some embodiments, the UE's own CORESET comprises a UE-specific CORESET comprising one or more UE-specific PDCCHs configured to carry UE specific DCI. In some embodiments, the UE 104 is further configured to receive and process the PDSCH dynamic rate matching resource set configuration signal 108 received from the gNodeB 102, in order to identify the one or more overlap resource sets. In some embodiments, the rate-matched resource set configuration signal 106 and the PDSCH dynamic rate matching resource set configuration signal 108 comprises radio resource control (RRC) signals or higher layer signals. For example, in some embodiments, the rate-matched resource set configuration signal 106 and the PDSCH dynamic rate matching resource set configuration signal 108 may be provided to the UE 104 based on UE-specific RRC signaling (PDSCH-Config) or cell-specific RRC signaling (ServingCellConfig-Common) or a combination thereof. In particular, in some embodiments, the PDSCH dynamic rate matching resource set configuration signal 108 comprises a UE-specific RRC signal. Further, in some embodiments, the rate-matched resource set configuration signal 106 comprises a UE-specific radio resource control (RRC) signal or a cell-specific RRC signal. In some embodiments, the cell-specific RRC signal may include one or more of Remaining Minimum System Information (RMSI) and Other System Information (OSI). In some embodiments, RMSI comprises system information block type 1 (SIB1) and OSI comprises SIBx (x>1).

In some embodiments, the one or more overlap resource sets comprised within the PDSCH dynamic rate matching resource set configuration signal 108 is a subset of the plurality of rate-matched resource sets comprised within the rate-matched resource set configuration signal 106. In such embodiments, the rate-matched resource set configuration signal 106 may be generated at the gNodeB 104, prior to generating the PDSCH dynamic rate matching resource set configuration signal 108. However, in other embodiments, the rate-matched resource set configuration signal 106 and the PDSCH dynamic rate matching resource set configuration signal 108 may be configured independently with no dependency between the one or more overlap resource sets comprised within the PDSCH dynamic rate matching resource set configuration signal 108 and the plurality of rate-matched resource sets comprised within the rate-matched resource set configuration signal 106. In such embodiments, the gNodeB 102 may be configured to generate and provide the PDSCH dynamic rate matching resource set configuration signal 108 to the UE 104, even without signaling the rate-matched resource set configuration signal 106 to the UE 104.

In some embodiments, the gNodeB 102 is further configured to generate the PDSCH rate matching indicator signal 110 and provide the generated PDSCH rate matching indicator signal 110 to the UE 104. In some embodiments, the PDSCH rate matching indicator signal 110 comprises information on a set of overlap resource sets within the one or more overlap resource sets (included within the PDSCH dynamic rate matching resource set configuration signal 108) on which the overlapping PDSCH may be mapped. In other words, the PDSCH rate matching indicator signal 110 provides a dynamic sharing indication of one or more overlap resource sets within the PDSCH dynamic rate matching resource set configuration signal 108. In some embodiments, the PDSCH rate matching indicator signal 110 comprises a layer 1 signal. In some embodiments, the PDSCH rate matching indicator signal 110 comprises a UE specific downlink control information (DCI) on an NR PDCCH. In some embodiments, the UE specific DCI comprises scheduling information for a unicast PDSCH. In some embodiments, common DCI scheduling any common control messages is not utilized for providing dynamic sharing indication, in order to minimize the DCI format size for common DCI. In some embodiments, the UE 104 is further configured to receive and process the PDSCH rate matching indicator signal 110 received from the gNodeB 102, in order to identify the set of overlap resource sets within the one or more overlap resource sets (included within the PDSCH dynamic rate matching resource set configuration signal 108) on which the overlapping PDSCH may be mapped.

In some embodiments, the PDSCH rate matching indicator signal 110 or the UE-specific DCI comprises a bitmap filed, Rate matching indicator, comprising a plurality of bits (e.g., 1, 2 or 3 bits), wherein each bit corresponds to an overlap resource set identified within the PDSCH dynamic rate matching resource set configuration signal 108 (indicated by higher layer parameters rateMatchPattern or rateMatchPatternGroup1 and rateMatchPatternGroup2) and potentially the UE's own CORESETs if not explicitly configured via the PDSCH dynamic rate matching resource set configuration signal 108 and the rate-matched resource set configuration signal 106. In some embodiments, this indicator is only present in DCI format 1_1 that may only be used for unicast PDSCH using cell radio network temporary identifier (C-RNTI), i.e., not for scheduling of PDSCH for other purposes (e.g., using other RNTIs). In some embodiments, with varying number of resource sets, the bit-width of the bitmap field in the DCI may change, leading to multiple DCI format sizes that could potentially increase UE's blind decoding (BD) efforts. To address this, in some embodiments, padding bits may be added to the bitmap field indicating dynamic resource sharing so that the DCI format is size-matched to certain candidate values. Alternately, in some embodiments, padding bits may be added to the overall DCI format for the same purpose. In some embodiments, the amount of padding bits to be added is determined taking into consideration the granularity of DCI format sizes supported in NR. For instance, unlike in long term evolution (LTE), wherein the DCI format sizes have a granularity of 1 bit, in NR, the granularity of DCI format sizes can be restricted to be greater than 1 bit, e.g., 2, 4, or 8 bits. Further, in some embodiments, in order to reduce the number of padding bits added, the various overlap resource sets are grouped into resource set groups each resource set group comprising a plurality of overlap resource sets and each resource set group is identified using the bits/padding bits.

In some embodiments, the one or more overlap resource sets comprised within the PDSCH dynamic rate matching resource set configuration signal 108 comprises the UE's own control resource set (CORESET). In such embodiments, the PDSCH rate matching indicator signal 110 (or the DCI associated with the UE's own CORESET) may be configured to provide an indication that the PDSCH may be mapped to resources associated with the UE's own CORESET. In such embodiments, the UE 104 is configured to assume that the PDSCH may be mapped to resources associated with the UE's own CORESET except the resources of a scheduled physical downlink control channel (PDCCH) carrying the DCI for the overlapping PDSCH within the UE's own CORESET.

In some embodiments, the plurality of rate-matched resource sets comprised within the rate-matched resource configuration signal 106 may comprise the UE's own CORESET, however, the PDSCH dynamic rate matching resource set configuration signal 108 may not identify the UE's own CORESET. Further, in some embodiments, both the plurality of rate-matched resource sets comprised within the rate-matched resource configuration signal 106 and the PDSCH dynamic rate matching resource set configuration signal 108 may not identify the UE's own CORESET. In both the above embodiments, the UE 104 is configured to assume that any overlapping PDSCH may be mapped to resources associated with the UE's own CORESET, except the resources of a scheduled physical downlink control channel (PDCCH) carrying the DCI for the overlapping PDSCH within the UE's own CORESET.

In some embodiments, the one or more overlap resource sets comprised within the PDSCH dynamic rate matching resource set configuration signal 108 comprises a common CORESET with common DCI (that the UE 104 is expected to monitor and receive) as well as a UE-specific DCI scheduling unicast PDSCH. In such embodiments, if the set of overlap resource sets indicated within the PDSCH rate matching indicator signal 110 comprises the common DCI, the UE 104 is configured to assume that the overlapping PDSCH is rate-matched around the scheduling PDCCH carrying the UE-specific DCI as well as the PDCCH carrying the common DCI. In other words, the UE 104 is configured to assume that the overlapping PDSCH may not be mapped to the resources associated with the scheduling PDCCH as well as the PDCCH carrying the common DCI. However, in other embodiments, the UE 104 may be configured to assume that the overlapping PDSCH is rate-matched around the entire CORESET (i.e., the common CORESET). Alternately, in some other embodiments, the UE 104 may be configured to assume that the overlapping PDSCH is rate-matched (or may not be mapped) around the scheduling PDCCH only, based on a further indication within the PDSCH rate matching indicator signal 110.

In some embodiments, the UE 104 may be configured with multi-transmission-reception point (TRP) operation for PDSCH. In such embodiments, the UE 104 may be configured to monitor a set of scheduled PDCCHs associated with a respective set of different TRPs in a set of different CORESETs. In such embodiments, one or more overlap resource sets comprised in the PDSCH dynamic rate matching resource set configuration signal 108 may comprise the set of CORESETs associated with the UE (associated with the different TRPs). In other words, the PDSCH dynamic rate matching resource set configuration signal 108 may be configured to support dynamic resource sharing associated with different CORESETs carrying the respective PDCCHs associated with different TRPs. In such embodiments, the PDSCH rate matching indicator signal 110 may comprise a first PDSCH rate matching indicator signal (or a first DCI) associated with a first PDCCH and a second PDSCH rate matching indicator signal (or a second DCI) associated with a second PDCCH. In some embodiments, the first DCI is configured to indicate dynamic use of the resources only for the resource set for first PDCCH (in first CORESET). In some embodiments, the first DCI is further configured to indicate that any overlapping PDSCH is to be assumed as rate matched around the second resource set (containing the second CORESET).

In some embodiments, the UE 104 may be configured to monitor a set of scheduled PDCCHs associated with a respective set of different TRPs in a single CORESET. In some embodiments, if the one or more overlap resource sets comprised in the PDSCH dynamic rate matching resource set configuration signal 108 comprises the said CORESET, the PDSCH rate matching indicator signal 110 (i.e., first DCI and the second DCI) associated with the corresponding scheduled PDCCHs is configured to provide an indication that the PDSCH may not be mapped to resources associated with the entire CORESET. In some embodiments, this feature enables to provide robustness against missed DCIs. Alternately, in some embodiments, if the one or more overlap resource sets comprised in the PDSCH dynamic rate matching resource set configuration signal 108 comprises the said CORESET, the PDSCH rate matching indicator signal 110 (i.e., first DCI and the second DCI) associated with the corresponding scheduled PDCCHs is configured to provide an indication if the overlapping PDSCH may or may not be mapped to resources associated with the said CORESET, except the resources of the scheduled PDCCHs. Further, in some embodiments, if one or more CORESETs the UE 104 is configured to monitor (including UE's own CORESET, common CORESET, CORESETs associated with different TRPs etc.) are not included in the PDSCH dynamic rate matching resource set configuration signal 108 and the rate-matched resource set configuration signal 106, the PDSCH rate matching indicator signal 110 (e.g., dynamic signaling) may be configured to indicate the reuse of the resources associated with the one or more CORESETs for overlapping PDSCH.

In some embodiments, when the UE 104 is configured with multiple downlink (DL) bandwidth parts (BWPS) and dynamic switching between the multiple DL BWPs, the PDSCH dynamic rate matching resource set configuration signal 108 and the rate-matched resource set configuration signal 106 are separately indicated to the UE for each of the one or more DL BWPs configured to the UE. In some embodiments, a DL bandwidth part (BWP) comprises a subset of contiguous resource blocks (RBs) on a carrier. Multiple bandwidth parts (e.g., up to 4) may be configured in the UE for each of the uplink (UL) and downlink (DL), however, at a given time, only one bandwidth part is active per transmission direction (either UL or DL). Due to BWP concept, UE can receive on narrow bandwidth part and when required network informs UE to switch on wider BW for reception.

In some embodiments, both the rate-matched resource set configuration signal 106 and the PDSCH dynamic rate matching resource set configuration signal 108 are configured to include information on one or more of a time-domain granularity, a frequency-domain granularity and an associated periodicity of the resource sets associated therewith. In some embodiments, in order to indicate the frequency domain resource configuration granularity, the rate-matched resource set configuration signal 106 and the PDSCH dynamic rate matching resource set configuration signal 108 may include information on a resource block group (RBG) size associated with a plurality of bandwidth parts (BWPs). Further, in some embodiments, if the rate-matched resource set configuration signal 106 and the PDSCH dynamic rate matching resource set configuration signal 108 includes a CORESET, the rate-matched resource set configuration signal 106 and the PDSCH dynamic rate matching resource set configuration signal 108 may be configured to include the CORESET frequency-domain and time-domain configurability (both contiguous and non-contiguous), given by the parameters controlResourceSetId, monitoringSlotPeriodicityAndOffset and monitoringSymbolsWithinSlot. In addition, in some embodiments, information on the physical resource blocks (PRBs) (indicated by higher layer parameter resourceBlocks given by RateMatchPattern) associated with the various resource sets (both contiguous and non-contiguous or only contiguous via start and end-PRBs) may be provided within the rate-matched resource set configuration signal 106 and the PDSCH dynamic rate matching resource set configuration signal 108 to indicate the frequency domain resource configuration granularity.

In some embodiments, in order to indicate the time-domain resource configuration granularity, the rate-matched resource set configuration signal 106 and the PDSCH dynamic rate matching resource set configuration signal 108 may include information on symbol-level (limited to first 3 symbols of a slot (for slot-based)), indicated by higher layer parameters symbolsInResourceBlock given by RateMatchPattern. If dynamic sharing of symbol-level (e.g., for non-slot-based scheduling) CORESETs is also supported, then the limitation to first 3 symbols of a slot should be relaxed to possibly all symbols in a slot or the first 10 or 12 symbols in a slot. Further, in some embodiments, in order to indicate the time-domain resource configuration granularity, the rate-matched resource set configuration signal 106 and the PDSCH dynamic rate matching resource set configuration signal 108 may include a bitmap of symbol indices. In some embodiments, the resource sets included within the rate-matched resource set configuration signal 106 and the PDSCH dynamic rate matching resource set configuration signal 108 are configured with an associated periodicity, such that at least periodicities in multiples of slots are supported. In some embodiments, the supported periodicities include at least those supported for configuration of slot-level and symbol-level NR PDCCH CORESETs. In such embodiments, the rate-matched resource set configuration signal 106 and the PDSCH dynamic rate matching resource set configuration signal 108 may include information on the periodicities (indicated by the higher layer parameter periodicityAndPattern) associated with the corresponding resource sets.

Figure 2:
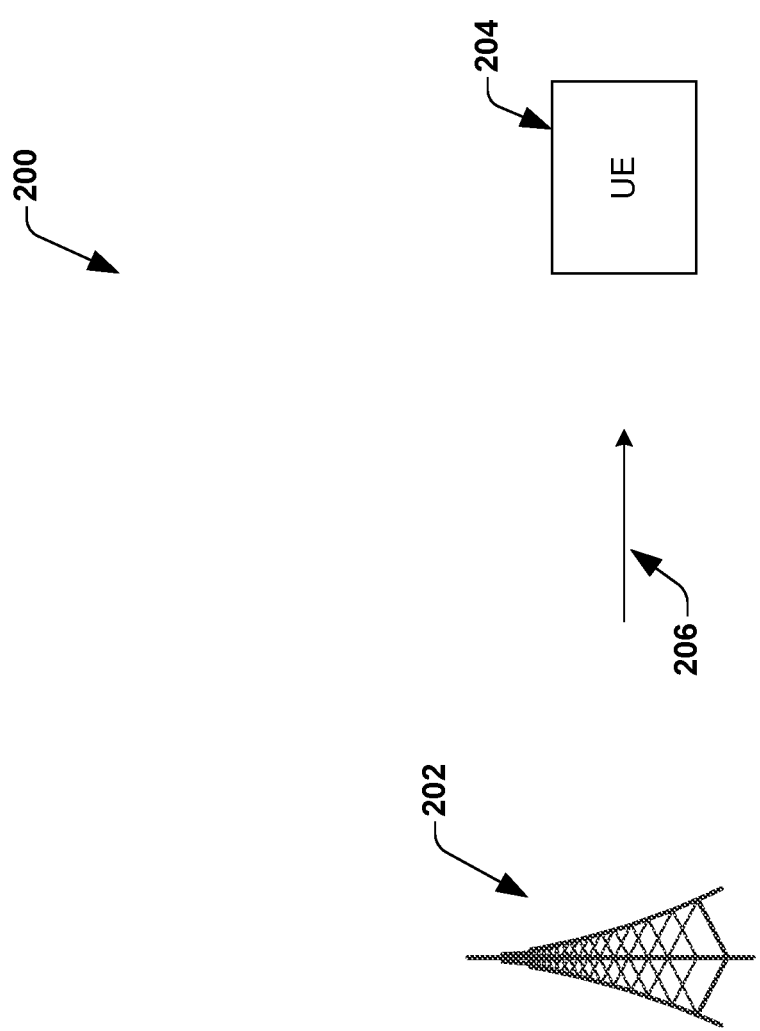
FIG. 2 illustrates a simplified block diagram of a new radio (NR) communication system that supports shortened transmission time interval (sTTI) operations, according to one embodiment of the disclosure.

FIG. 2 illustrates a simplified block diagram of a new radio (NR) communication system 200 that supports shortened transmission time interval (sTTI) operations, according to one embodiment of the disclosure. In some embodiments, NR communication system 200 comprises a 5G system. The NR communication system 100 comprises a new generation Node B (gNodeB) 202 and a user equipment 204 configured to communicate with one another. However, in other embodiments, the NR communication system 200 may comprise a plurality of gNodeBs and UEs configured to communicate with one another. In some embodiments, the NR communication system 200 is configured to support shortened or shorter transmission time interval (sTTI) operation. The sTTI is implemented by splitting a 1 ms subframe or transmission time interval TTI with duration shorter than a subframe. There are different sTTI configurations in the 3GPP LTE standard i.e. 2-symbols and slot-based sTTI. In particular, 2-symbols sTTIs in a subframe may consist of 2 symbols or 3 symbols. For sTTI operation, short resource-element groups (SREGs) are used as basic block for defining the mapping of short control channels to resource elements (REs). In some embodiments, one SREG is composed of all resource elements in a physical resource block in a given OFDM symbol. The techniques described herein may be used for various wireless communication networks such as 3GPP Long Term Evolution (LTE) and 5G New Radio (NR). The terms "shorten Transmission Time Interval (sTTI)", "(sub)slot", "subslot", "mini-slot", and "non-slot" are used interchangeably with the same definition.

Hereinafter, the term of "NR communication system" is used to represent both "LTE and NR communication system". Also, unless explicitly mentioned, the term of "gNodeB" represents both "gNodeBs and eNBs or eNodeBs" without loss of the generality. In some embodiments, the NR communication system 200 utilizes a short physical downlink control channel (SPDCCH) for carrying scheduling assignments and other control information for the (sub) slot-based physical downlink shared channel (SPDSCH). In some embodiments, the gNodeB 202 is configured to provide the SPDCCH to the UE 204, in order to enable the UE to decode the data carried in the SPDSCH. In some embodiments, gNodeB 202 is configured to provide the SPDCCH to the UE 204 on a SPDCCH candidate comprising an aggregation of one or several consecutive short control channel elements (SCCEs). In some embodiments, the gNodeB 202 is configured to configure/determine the SPDCCH candidate, prior to providing the SPDCCH to the UE 204. In order to configure the SPDCCH candidate, in some embodiments, the gNodeB 202 is configured to configure/define a shortened physical downlink control channel (SPDCCH) resource set comprising a plurality of time-frequency resources. In some embodiments, the resource configuration associated with the SPDCCH resource set is indicated to the gNodeB 202 by higher layers. In some embodiments, the SPDCCH resource set is further referred to as a SPDCCH search space and can comprise a plurality of SPDCCH candidates to be utilized to provide downlink control information (DCI) to the UE 204. In some embodiments, the plurality of time-frequency resources within the SPDCCH resource set is grouped into a plurality of short resource element groups (SREGs).

Figure 3A:
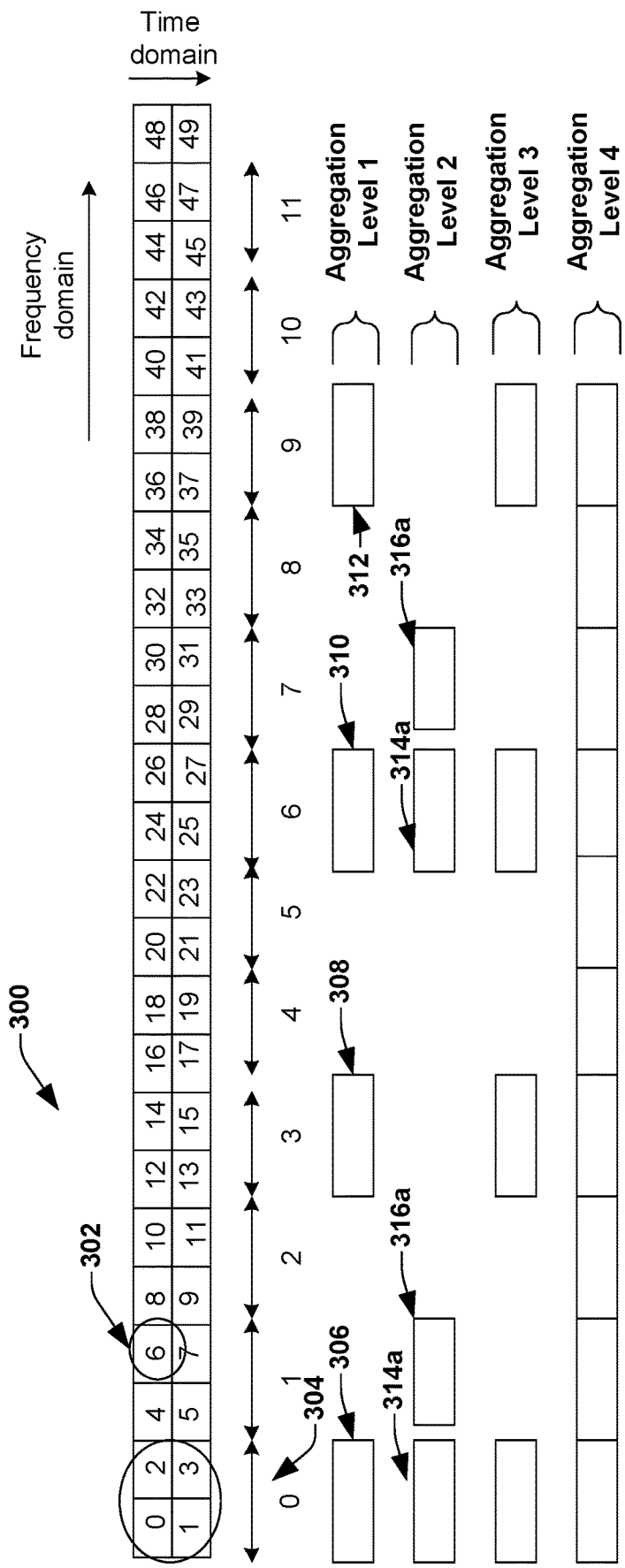
FIG. 3a illustrates an example SPDCCH resource set, according to one embodiment of the disclosure.

FIG. 3a illustrates an example SPDCCH resource set 300, according to one embodiment of the disclosure. The SPDCCH resource set 300 includes 25 SREGs over 2 symbols. Referring back to FIG. 2 again, in some embodiments, each of the plurality of SREGs within the SPDCCH resource set is identified by a corresponding SREG number (e.g., SREG 302 identified by SREG number 6 in FIG. 3a). In some embodiments, one SREG is composed of all resource elements in a physical resource block in a given orthogonal frequency division multiplexing (OFDM) symbol. In some embodiments, the plurality of SREGs within the SPDCCH resource set are numbered based on a reference signal type associated with the SPDCCH resource set. For example, for demodulation reference signal (DMRS) based SPDCCH transmission, the plurality of SREGs are numbered from $0-N_{SREG}-1$, in an increasing order of first time and then frequency (e.g., the SPDCCH resource set 300 in FIG. 3a is DMRS-based), and for cell specific reference signal (CRS) based SPDCCH transmission, the plurality of SREGs are numbered from $0-N_{SREG}-1$, in an increasing order of first frequency and then time. In some embodiments, the $N_{SREG}$ comprises a number of SREGs within the SPDCCH resource set.

In some embodiments, the gNodeB 202 is further configured to configure a plurality of shortened control channel elements (SCCEs) within the SPDCCH resource set. In some embodiments, the plurality of SCCEs are identified by a respective plurality of SCCE numbers (e.g., SCCE 304 identified by the SCCE number 0). In some embodiments, each SCCE of the plurality of SCCEs within the SPDCCH resource set comprises a set of SREGs of the plurality of SREGs. In some embodiments, the gNodeB 202 is configured to define the plurality of SCCEs based on grouping the plurality of SREGs within the SPDCCH resource set, by utilizing an information of the resource signal type associated with the SPDCCH resource set, in accordance with a predefined SCCE relation. In some embodiments, the predefined SCCE relation is as given below:

$$y = N_{SREG}^{SCCE} \cdot n + j \qquad (1)$$

where y is the SREG number, $N_{SREG}^{SCCE}$ is the number of SREGs with each SCCE, n is the SCCE number and j=0, 1, . . . , $N_{SREG}^{SCCE}-1$. In some embodiments, the SCCEs available for transmission of SPDCCHs are numbered from 0 to $N_{SCCE}-1$ (i.e., n=0 to $N_{SCCE}-1$), where $N_{SCCE}$ is the total number of SCCEs within the SPDCCH resource set.

In some embodiments, the number of SREGs with each SCCE, $N_{SREG}^{SCCE}$, is predefined and is a function of the reference signal type associated with the SPDCCH resource set. For example, for cell-specific reference signal (CRS) based SPDCCH transmission, the number of SREGs with each SCCE, $N_{SREG}^{SCCE}=4$. Further, for demodulation reference signal (DMRS) based SPDCCH transmission, where SPDCCH spans 2 symbols, the number of SREGs with each SCCE, $N_{SREG}^{SCCE}=4$. However, for DMRS based SPDCCH transmission, where SPDCCH spans 3 symbols, the number of SREGs with each SCCE, $N_{SREG}^{SCCE}=3$ or $N_{SREG}^{SCCE}=3$, depending on whether DMRS bundling or SREG bundling is applied or not. In particular, for DMRS based SPDCCH transmission, where SPDCCH spans 3 symbols, the number of SREGs with each SCCE, $N_{SREG}^{SCCE}=3$, when DMRS bundling or SREG bundling is not applied. Further, for DMRS based SPDCCH transmission, where SPDCCH spans 3 symbols, the number of SREGs with each SCCE, $N_{SREG}^{SCCE}=6$, when DMRS bundling or SREG bundling is applied. In some embodiments, the term or operation "DMRS bundling" or "SREGs bundling" means a UE configured with DMRS-based transmission for a given control channel may assume that precoding granularity is multiple resource blocks in the frequency domain or multiple consecutive SREGs to conduct channel estimation. In some embodiments, size of SREGs bundle may be fixed, e.g., 2 physical resource blocks (PRBs).

In some embodiments, the gNodeB 202 is further configured to configure one or more SPDCCH candidates within the SPDCCH resource set, each SPDCCH candidate comprising one or more SCCEs of the plurality of SCCEs within the SPDCCH resource set. In some embodiments, the gNodeB 202 is configured to define the one or more SPDCCH candidates based on an information of the resource signal type and an aggregation level L associated with the SPDCCH resource set, in accordance with a predefined SPDCCH candidate relation. In some embodiments, the predefined SPDCCH candidate relation is a function of the reference signal type and the aggregation level L associated with the SPDCCH resource set. For example, for DMRS-based SPDCCH transmission when L=1, the SPDCCH candidate relation is as given below:

$$n = L\left\{\left(O_p + \left\lfloor \frac{m \cdot N_{SCCE}}{L \cdot M^L} \right\rfloor\right) \bmod \left\lfloor \frac{N_{SCCE}}{L} \right\rfloor\right\} + i \cdot \left\lfloor \frac{N_{SCCE}}{L} \right\rfloor \qquad (2)$$

Further, for DMRS-based SPDCCH transmission when L=2, 4, 8 to enable SCCE-based distribution mapping assuming the application of DMRS bundling or SREGs bundling for SPDCCH, the SPDCCH candidate relation is as given below:

$$n = (O_p + m) \bmod \left\lfloor \frac{N_{SCCE}}{L} \right\rfloor + i \cdot \left\lfloor \frac{N_{SCCE}}{L} \right\rfloor \qquad (3)$$

In some embodiments, the SPDCCH candidate relation given in equation (3) above is also applicable for DMRS-based SPDCCH transmission when L=1.

Furthermore, CRS-based SPDCCH transmission, the SPDCCH candidate relation is as given below:

$$n = L\left\{(O_p + m) \bmod \left\lfloor \frac{N_{SCCE}}{L} \right\rfloor\right\} + i \qquad (4)$$

Where n is the SCCE number, $O_p$ is an offset value configured by higher layers for sPDCCH resource set, m is the SPDCCH candidate number where m=0, 1, . . . , $M^L-1$; i=0, . . . , L-1; $M^L$ is the maximum number of SPDCCH candidates for aggregation level (AL) L in sPDCCH resource set, which is configured by higher layers and $N_{SCCE}$ is the total number of SCCEs within the SPDCCH resource set.

Figure 3B:
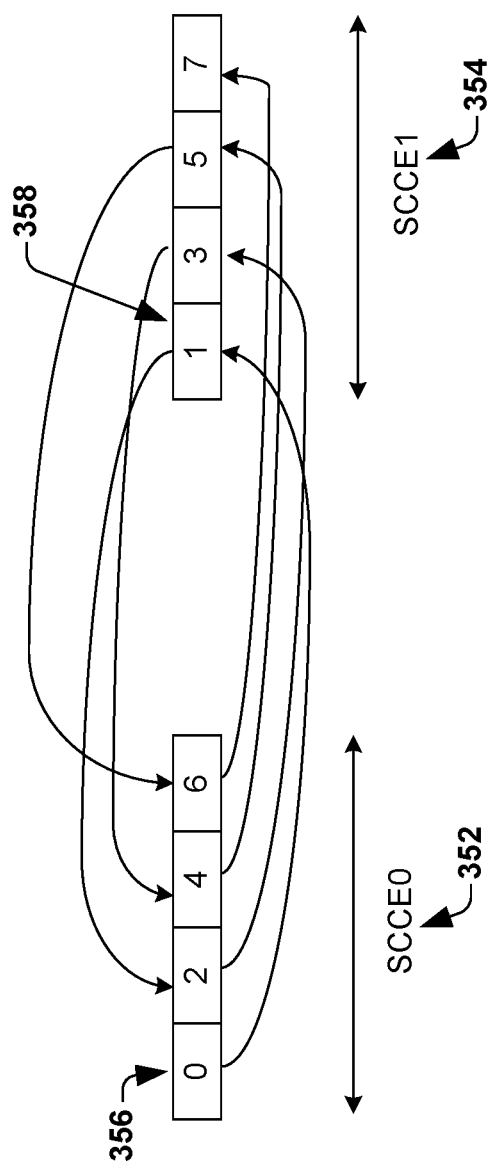
FIG. 3b illustrates mapping of modulated symbols of downlink control information (DCI) to SPDCCH candidates, according to one embodiment of the disclosure.

Referring back to FIG. 3a, it can be seen that, for aggregation level 1, there are 4 SPDCCH candidates, each comprising one SCCE associated therewith. For example, SPDCCH candidate 306 comprising SCCE with the SCCE number 0, SPDCCH candidate 308 comprising SCCE with the SCCE number 3, SPDCCH candidate 310 comprising SCCE with the SCCE number 6 and SPDCCH candidate 312 comprising SCCE with the SCCE number 9. Similarly, for aggregation level 2, there are 2 SPDCCH candidates, each comprising 2 SCCEs associated therewith. For example, SPDCCH candidate 314a comprising SCCEs with the SCCE number 0 and 6, and SPDCCH candidate 316a comprising SCCEs with the SCCE numbers 1 and 7. In some embodiments, this design ensures that the sPDCCH candidates with AL L only starts from an SCCE fulfilling the condition of i mod K=0 where i refers to the SCCE number and K is the number of SCCEs corresponding to the aggregation level L. Upon configuring the one or more SPDCCH candidates, in some embodiments, the gNodeB 202 is configured to generate the DCI 206 and map the DCI 206 (or a block of complex valued modulation symbols associated with the DCI) to a select SPDCCH candidate of the one or more SPDCCH candidates, and provide the DCI 206 to the UE 204. In some embodiments, the DCI 206 is mapped to the select SPDCCH candidate in an increasing order of first the SCCE number and then the SREG number, as illustrated in FIG. 3b. In FIG. 3b, the aggregation level L=2 and each SCCE consists of 4 SREGs. The modulated symbols associated with the DCI are mapped first to SREG 356 of SCCE0 352 followed by SREG 358 of SCCE1 354. In some embodiments, 0, 2, 4, 6 in SCCE0 352 and 1, 3, 5, 7 in SCCE1 354 indicates the mapping order.

In some embodiments, the UE 204 is configured to monitor the one or more SPDCCH candidates within the predefined SPDCCH resource set, in order to receive the DCI 206. In some embodiments, the UE 204 is configured to determine the one or more SPDCCH candidates, prior to monitoring the one or more SPDCCH candidates. In some embodiments, the UE 204 is configured to determine the one or more SPDCCH candidates based on an information of the aggregation level associated with the predefined SPDCCH resource set. In some embodiments, determining the one or more SPDCCH candidates comprises determining an SPDCCH candidate number m associated with the one or more SPDCCH candidates, wherein m=0, 1, . . . , $M^L-1$; and $M^L$ is the maximum number of SPDCCH candidates for aggregation level (AL) L in an sPDCCH resource set p, which is configured by higher layers. In order to determine the resource configuration associated with the one or more SPDCCH candidates, in some embodiments, the UE 204 is further configured to determine one or more shortened control channel elements (SCCEs) associated with each of the one or more SPDCCH candidates. In some embodiments, the UE 204 is configured to determine the one or more SCCEs based on an information of a reference signal type and the aggregation level of the associated SPDCCH resource set, in accordance with the predefined SPDCCH candidate relation given in equations (2), (3) or (4) above. The criteria for choosing between equations (2), (3) or (4) is same as given above. In some embodiments, determining the one or more SCCEs associated with each of the one or more SPDCCH candidates comprises determining one or more SCCE numbers that respectively identifies the one or more SCCEs. In some embodiments, the UE 204 is configured to receive information on the associated SPDCCH resource set (e.g., resource configuration, reference signal type, aggregation level L etc.) based on radio resource control (RRC) signaling from the gNodeB 202. Therefore, in some embodiments, the gNodeB 202 is further configured to provide one or more RRC signals comprising information on a SPDCCH control resource set to the UE 204, prior to providing the DCI 206 to the UE 204.

Upon determining the one or more SCCEs associated with each of the one or more SPDCCH candidates, the UE 204 is further configured to determine a set of shortened resource element groups (SREGs) associated with each of the one or more SCCEs associated with the one or more SPDCCH candidates. In some embodiments, the UE 204 is configured to determine the set of shortened resource element groups (SREGs) associated with each of the one or more SCCEs associated with the one or more SPDCCH candidates, based on an information of the reference signal type the associated SPDCCH resource set, in accordance with the predefined SCCE relation given in equation (1) above. In some embodiments, determining the set of SREGs associated with each of the one or more SCCEs comprises determining a set of SREG numbers that respectively identifies the set of SREGs. Once the SREGs associated with each of the SPDCCH candidates are determined at the UE 204, the UE 204 is configured to monitor the one or more SPDCCH candidates and receive the DCI 206 on a select SPDCCH candidate. Upon receiving the DCI 206, the UE 204 is further configured to the process the DCI 206, in order to decode the information associated with the DCI 206.

Figure 4:
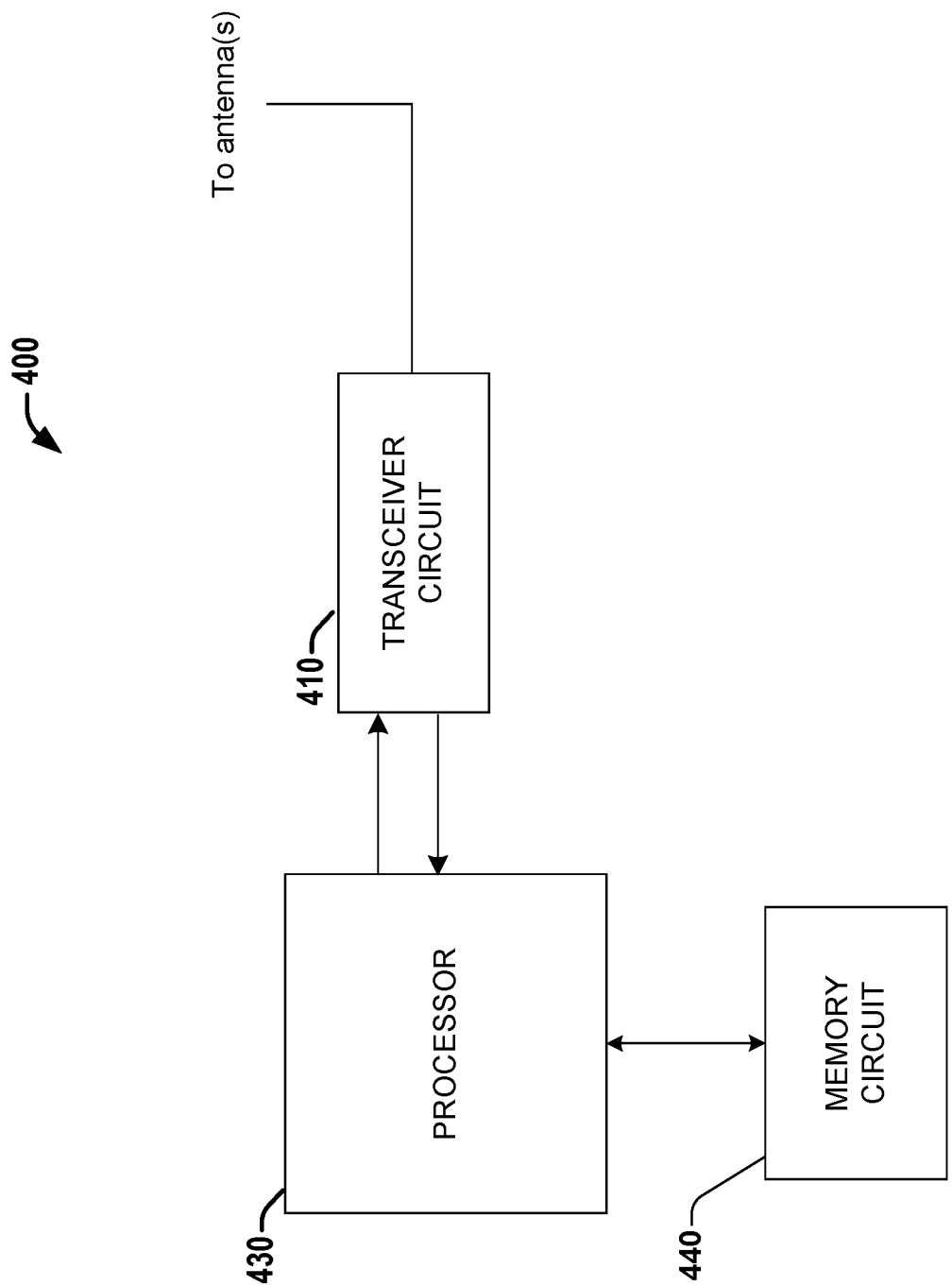
FIG. 4 illustrates a block diagram of an apparatus employable at a Base Station (BS), eNodeB, gNodeB or other network device, according to various aspects described herein.

Referring to FIG. 4, illustrated is a block diagram of an apparatus 400 employable at a Base Station (BS), eNodeB, gNodeB or other network device, according to various aspects described herein. In some embodiments, the apparatus 400 may be included within the gNodeB 102 in FIG. 1. Alternately, in some embodiments, the apparatus 400 may be included within the gNodeB 202 in FIG. 1. However, in other embodiments, the apparatus 400 could be included within any gNodeB associated with a new radio (NR) system. System 400 can include one or more processors 430 (e.g., one or more baseband processors such as one or more of the baseband processors discussed in connection with FIG. 10 and/or FIG. 11) comprising processing circuitry and associated interface(s) (e.g., one or more interface(s) discussed in connection with FIG. 11), transceiver circuitry 410 (e.g., which can comprise circuitry for one or more wired (e.g., X2, etc.) connections and/or part or all of RF circuitry 1006, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 440 (which can comprise any of a variety of storage mediums and can store instructions and/or data associated with one or more of processor(s) 430 or transceiver circuitry 410). In various aspects, apparatus 400 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 430, transceiver circuitry 410, and the memory 440 can be included in a single device, while in other aspects, they can be included in different devices, such as part of a distributed architecture.

In a first embodiment, the apparatus 400 is included within the gNodeB 102 in FIG. 1. Therefore, the apparatus 400 is explained with reference to the NR communication system 100 in FIG. 1. All the features associated with the gNodeB 102 in FIG. 1 explained above is also applicable to the apparatus 400 in FIG. 4. In such embodiments, the processing circuit 430 is configured to generate a rate-matched resource set configuration signal (e.g., the rate matched resource set configuration signal 106 in FIG. 1) comprising information on a plurality of rate-matched resource sets, and provide the rate-matched resource configuration signal to a transceiver circuitry 410, for subsequent transmission to a UE (e.g., the UE 104 in FIG. 1) associated therewith. In some embodiments, each of the plurality of rate-matched resource sets comprises time-frequency resources on which any overlapping PDSCH is to be rate-matched or may not be mapped. In some embodiments, the processing circuit 430 is further configured to generate a physical downlink shared channel (PDSCH) dynamic rate matching resource set configuration signal (e.g., the PDSCH dynamic rate matching resource set configuration signal 108 in FIG. 1) comprising information on one or more overlap resource sets, and provide the PDSCH dynamic rate matching resource set configuration signal to the transceiver circuitry 410, for subsequent transmission to a UE. In some embodiments, each of the one or more overlap resource sets comprises time-frequency resources on which any overlapping PDSCH may or may not be mapped (i.e., dynamically mapped), based on an indication provided within a PDSCH rate matching indicator signal (e.g., the PDSCH rate matching indicator signal 110 in FIG. 1).

In some embodiments, the one or more overlap resource sets comprised within the PDSCH dynamic rate matching resource set configuration signal is a subset of the plurality of rate-matched resource sets comprised within the rate-matched resource set configuration signal. However, in other embodiments, the rate-matched resource set configuration signal and the PDSCH dynamic rate matching resource set configuration signal may be configured independently with no dependency between the one or more overlap resource sets comprised within the PDSCH dynamic rate matching resource set configuration signal and the plurality of rate-matched resource sets comprised within the rate-matched resource set configuration signal. In some embodiments, the rate-matched resource configuration signal and the PDSCH dynamic rate matching resource set configuration signal comprises radio resource control (RRC) signals. In some embodiments, the PDSCH dynamic rate matching resource set configuration signal comprise a UE-specific RRC signal. In some embodiments, the PDSCH dynamic rate matching resource set configuration signal and the rate-matched resource set configuration signal comprises information of one or more of a time-domain granularity, a frequency-domain granularity and an associated periodicity of the resource sets associated therewith.

In some embodiments, the processing circuit 430 is further configured to generate the PDSCH rate matching indicator signal and provide the PDSCH rate matching indicator signal to the transceiver circuitry 410, for subsequent transmission to a UE. In some embodiments, the PDSCH rate matching indicator signal comprises information on a set of overlap resource sets within the one or more overlap resource sets (included within the PDSCH dynamic rate matching resource set configuration signal) on which the overlapping PDSCH may be mapped. In some embodiments, the PDSCH rate matching indicator signal comprises a UE-specific downlink control information (DCI) associated with the UE. In some embodiments, the PDSCH rate matching indicator signal or the UE-specific DCI comprises a bitmap field, Rate matching indicator, comprising a plurality of bits (e.g., 1, 2 or 3 bits), wherein each bit corresponds to an overlap resource set identified within the PDSCH dynamic rate matching resource set configuration signal and potentially the UE's own CORESETs if not explicitly configured via the PDSCH dynamic rate matching resource set configuration signal and the rate-matched resource set configuration signal. In some embodiments, with varying number of resource sets, the bit-width of the bitmap field in the DCI may change, leading to multiple DCI format sizes that could potentially increase UE's blind decoding (BD) efforts. To address this, in some embodiments, padding bits are added to the bitmap field indicating dynamic resource sharing so that the DCI format is size-matched to certain candidate values. Alternately, in some embodiments, padding bits are added to the overall DCI format for the same purpose. In some embodiments, the processing circuit 430 is configured to generate the various signals above based on instructions stored within the memory circuit 440.

In some embodiments, the one or more overlap resource sets comprised within the PDSCH dynamic rate matching resource set configuration signal comprises the UE's own control resource set (CORESET). In such embodiments, the PDSCH rate matching indicator signal may be configured to provide an indication that the PDSCH may be mapped to resources associated with the UE's own CORESET. In some embodiments, the one or more overlap resource sets comprised in the PDSCH dynamic rate matching resource set configuration signal comprises one or more CORESETs associated with the UE, wherein the one or more CORE-SETs comprise scheduled physical downlink control channel (PDCCH) associated with one or more respective transmission-reception points (TRPs). In such embodiments, the PDSCH rate matching indicator signal 110 may comprise a first PDSCH rate matching indicator signal (or a first DCI) associated with a first PDCCH and a second PDSCH rate matching indicator signal (or a second DCI) associated with a second PDCCH. In some embodiments, the first DCI is configured to indicate dynamic use of the resources only for the resource set for first PDCCH (in first CORESET). In some embodiments, the first DCI is further configured to indicate that any overlapping PDSCH is to be assumed as rate matched around the second resource set (containing the second CORESET).

Further, in some embodiments, the one or more overlap resource sets comprised in the PDSCH dynamic rate matching resource set configuration signal comprises a CORESET associated with the UE comprising a plurality of scheduled PDCCHs carrying a respective plurality of DCIs from a plurality of different transmission-reception points (TRPs). In such embodiments, the PDSCH rate matching indicator signal associated with the corresponding scheduled PDCCHs is configured to provide an indication that the PDSCH may not be mapped to resources associated with the entire CORESET. Alternately, in some embodiments, PDSCH rate matching indicator signal associated with the corresponding scheduled PDCCHs is configured to provide an indication if the overlapping PDSCH may or may not be mapped to resources associated with the CORESET, except the resources of the scheduled PDCCHs. In some embodiments, when the CORESETs that the UE is already configured to monitor are not included in the rate-matched resource set configuration signal and the PDSCH dynamic rate matching resource set configuration signal, the PDSCH rate matching indicator signal may be used to indicate reuse of CORESET resources for overlapping PDSCH. Further, in some embodiments, when the UE is configured with multiple (e.g., one or more) bandwidth parts (BWPs), the PDSCH dynamic rate matching resource set configuration signal and the rate-matched resource set configuration signal are separately indicated to the UE for each of the one or more DL BWPs configured to the UE.

In a second embodiment, the apparatus 400 is included within the gNodeB 202 in FIG. 2. Therefore, the apparatus 400 is explained with reference to the NR communication system 200 in FIG. 2 and the SPDCCH resource set 300 in FIG. 3a. All the features associated with the gNodeB 202 in FIG. 2 explained above is also applicable to the apparatus 400 in FIG. 4. In such embodiments, the processing circuit 430 is configured to configure one or more shortened physical downlink control channel (SPDCCH) candidates to be utilized to provide a downlink control information (DCI) to a UE (e.g., the UE 204 in FIG. 2). In order to determine the one or more SPDCCH candidates, in some embodiments, the processing circuit 430 is configured to configure a shortened physical downlink control channel (SPDCCH) resource set (e.g., the SPDCCH resource set 300 in FIG. 3a) comprising a plurality of time-frequency resources. In some embodiments, the plurality of time-frequency resources within the SPDCCH resource set is grouped into a plurality of short resource element groups (SREGs) and each of the plurality of SREGs is identified by a corresponding SREG number. In some embodiments, processing circuit 430 is configured to configure the SPDCCH resource set based on information provided by the higher layers, in accordance with instructions stored in the memory circuit 440.

Upon configuring the SPDCCH resource set, in some embodiments, the processing circuit 430 is further configured to configure a plurality of shortened control channel elements (SCCEs) identified by a respective plurality of SCCE numbers within the SPDCCH resource set. In some embodiments, each SCCE comprises a set of SREGs of the plurality of SREGs. In some embodiments, the processing circuit 430 is configured to configure the plurality of SCCEs based on grouping the plurality of SREGs by utilizing an information of the resource signal type associated with the SPDCCH resource set, in accordance with a predefined SCCE relation (e.g., the predefined SCCE relation given in equation (1) above). In some embodiments, the processing circuit 430 is further configured to configure one or more SPDCCH candidates (e.g., SPDCCH candidate 306, 308 etc. in FIG. 3a) within the SPDCCH resource set. In some embodiments, each SPDCCH candidate comprising one or more SCCEs of the plurality of SCCEs within the SPDCCH resource set. In some embodiments, the processing circuit 430 is configured to configure one or more SPDCCH candidates based on an information of the resource signal type and an aggregation level associated with the SPDCCH resource set, in accordance with a predefined SPDCCH candidate relation (e.g., the predefined SPDCCH candidate relation given in equation (2) or (3) or (4) above), as explained above with respect to FIG. 2.

In some embodiments, the predefined SCCE relation and the predefined SPDCCH candidate relation are stored within the memory circuit 440. Upon configuring the one or more SPDCCH candidates, the processing circuit 430 is further configured to generate the DCI and map the DCI to a select SPDCCH candidate of the one or more SPDCCH candidates. In some embodiments, the processing circuit 430 is further configured to provide the generated DCI to the transceiver circuitry 410, via an RF interface, for subsequent transmission to the UE. In some embodiments, the processing circuit 430 is configured to map the DCI to the select SPDCCH candidate in an increasing order of first the SCCE number and then the SREG number, as explained above with respect to FIG. 3b above.

Figure 5:
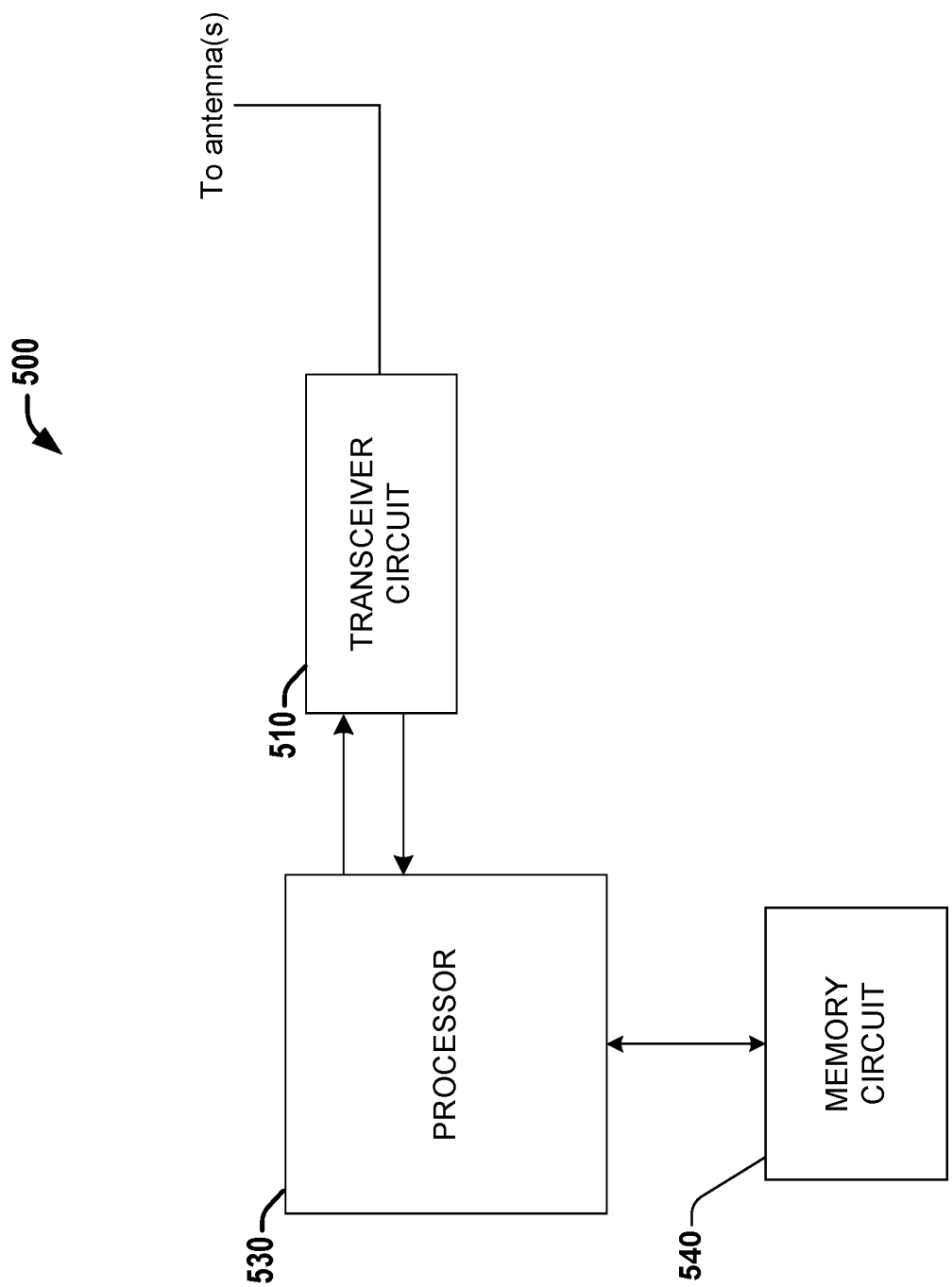
FIG. 5 illustrates a block diagram of an apparatus employable at a user equipment (UE) or other network device (e.g., IoT device), according to various aspects described herein.

Referring to FIG. 5, illustrated is a block diagram of an apparatus 500 employable at a user equipment (UE) or other network device (e.g., IoT device), according to various aspects described herein. In some embodiments, the apparatus 500 may be included within the UE 104 in FIG. 1. Alternately, in some embodiments, the apparatus 500 may be included within the UE 204 in FIG. 2. However, in other embodiments, the apparatus 400 could be included within any UE associated with a new radio (NR) system. Apparatus 500 can include one or more processors 530 (e.g., one or more baseband processors such as one or more of the baseband processors discussed in connection with FIG. 10 and/or FIG. 11) comprising processing circuitry and associated interface(s) (e.g., one or more interface(s) discussed in connection with FIG. 11), transceiver circuitry 510 (e.g., comprising part or all of RF circuitry 1006, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 540 (which can comprise any of a variety of storage mediums and can store instructions and/or data associated with one or more of processor(s) 530 or transceiver circuitry 510). In various aspects, apparatus 500 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 530) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 530) can comprise one or more of: identifying physical resources associated with the signal/message, detecting the signal/message, resource element group deinterleaving, demodulation, descrambling, and/or decoding.

In a first embodiment, the apparatus 500 is included within the UE 104 in FIG. 1. Therefore, the apparatus 500 is explained herein with reference to the NR communication system 100 in FIG. 1. All the features associated with the UE 104 in FIG. 1 explained above is also applicable to the apparatus 500 in FIG. 5. In such embodiments, the processing circuit 530 is configured to receive a rate-matched resource set configuration signal (e.g., the rate-matched resource set configuration signal 106 in FIG. 1), from a gNodeB (e.g., the gNodeB 102 in FIG. 1) via the transceiver circuitry 510. In some embodiments, the rate-matched resource set configuration signal comprises information on a plurality of rate-matched resource sets, each of the plurality of rate-matched resource sets comprising time-frequency resources that are to be rate-matched for any overlapping PDSCH. Upon receiving the rate-matched resource set configuration signal, in some embodiments, the processing circuit 530 is further configured to process the rate-matched resource set configuration signal, in order to identify the plurality of rate-matched resource sets.

In some embodiments, the processing circuit 530 is further configured to receive a physical downlink shared channel (PDSCH) dynamic rate matching resource set configuration signal (e.g., the PDSCH dynamic rate matching resource set configuration signal 108 in FIG. 1), from the gNodeB, via the transceiver circuitry 510. In some embodiments, the PDSCH dynamic rate matching resource set configuration signal comprises information on one or more overlap resource sets, each of the one or more overlap resource sets comprises time-frequency resources on which any overlapping PDSCH may or may not be mapped (e.g., may be dynamically mapped), based on an indication provided within a PDSCH rate matching indicator signal (e.g., the PDSCH rate matching indicator signal 110 in FIG. 1). Upon receiving the PDSCH dynamic rate matching resource set configuration signal, in some embodiments, the processing circuit 530 is further configured to process the PDSCH dynamic rate matching resource set configuration signal, in order to identify the one or more overlap resource sets. In some embodiments, the one or more overlap resource sets comprised within the PDSCH dynamic rate matching resource set configuration signal is a subset of the plurality of rate-matched resource sets comprised within the rate-matched resource set configuration signal. However, in other embodiments, the rate-matched resource set configuration signal and the PDSCH dynamic rate matching resource set configuration signal are independent of one another with no dependency between the one or more overlap resource sets comprised within the PDSCH dynamic rate matching resource set configuration signal and the plurality of rate-matched resource sets comprised within the rate-matched resource set configuration signal. In some embodiments, the rate-matched resource configuration signal and the PDSCH dynamic rate matching resource set configuration signal comprise radio resource control (RRC) signals. In some embodiments, the PDSCH dynamic rate matching resource set configuration signal and the rate-matched resource set configuration signal comprises information of one or more of a time-domain granularity, a frequency-domain granularity and an associated periodicity of the resource sets associated therewith.

In some embodiments, the processing circuit 530 is further configured to receive the PDSCH rate matching indicator signal (e.g., the PDSCH rate matching indicator signal 110 in FIG. 1), from the gNodeB, via the transceiver circuitry 510. In some embodiments, the PDSCH rate matching indicator signal comprises information on a set of overlap resource sets within the one or more overlap resource sets (included within the PDSCH dynamic rate matching resource set configuration signal) on which the overlapping PDSCH may be mapped. Upon receiving the PDSCH rate matching indicator signal, in some embodiments, the processing circuit 530 is further configured to process the PDSCH rate matching indicator signal, in order to identify the set of overlap resource sets on which any overlapping PDSCH may be mapped. In some embodiments, the PDSCH rate matching indicator signal comprises a UE-specific downlink control information (DCI) associated with the UE. In some embodiments, the PDSCH rate matching indicator signal or the UE-specific DCI comprises a bitmap field, Rate matching indicator, comprising a plurality of bits (e.g., 1, 2 or 3 bits), wherein each bit corresponds to an overlap resource set identified within the PDSCH dynamic rate matching resource set configuration signal and potentially the UE's own CORESET if not explicitly configured via the PDSCH dynamic rate matching resource set configuration signal and the rate-matched resource set configuration signal. In some embodiments, with varying number of resource sets, the bit-width of the bitmap field in the DCI may change, leading to multiple DCI format sizes that could potentially increase UE's blind decoding (BD) efforts. To address this, in some embodiments, padding bits are added to the bitmap field indicating dynamic resource sharing so that the DCI format is size-matched to certain candidate values. Alternately, in some embodiments, padding bits are added to the overall DCI format for the same purpose.

In some embodiments, the plurality of rate-matched resource sets comprised within the rate-matched resource configuration signal may comprise the UE's own CORESET, however, the PDSCH dynamic rate matching resource set configuration signal may not identify the UE's own CORESET. In such embodiments, the processing circuit is configured to assume that any overlapping PDSCH may be mapped to resources associated with the UE's own CORESET, except the resources of a scheduled physical downlink control channel (PDCCH) carrying the DCI for the overlapping within the UE's own CORESET. In some embodiments, the one or more overlap resource sets comprised within the PDSCH dynamic rate matching resource set configuration signal comprises the UE's own control resource set (CORESET). In some embodiments, the PDSCH rate matching indicator signal may comprise an indication that the PDSCH may be mapped to resources associated with the UE's own CORESET. In such embodiments, the UE 104 is configured to assume that PDSCH may be mapped to resources associated with the UE's own CORESET except the resources of a scheduled physical downlink control channel (PDCCH) carrying the DCI for the overlapping PDSCH within the UE's own CORESET. In some embodiments, the one or more overlap resource sets comprised in the PDSCH dynamic rate matching resource set configuration signal comprises one or more CORESETs associated with the UE or configured to the UE, wherein the one or more CORESETs comprise scheduled physical downlink control channel (PDCCH)s associated with one or more respective transmission-reception points (TRPs). In such embodiments, the PDSCH rate matching indicator signal may comprise one or more DCIs, each of which may be configured to provide an indication that the PDSCH may be mapped to resources associated with the CORESET carrying the respective PDCCHs.

Further, in some embodiments, the one or more overlap resource sets comprised in the PDSCH dynamic rate matching resource set configuration signal comprises a CORESET associated with the UE comprising a plurality of scheduled PDCCHs carrying a respective plurality of DCIs from a plurality of different transmission-reception points (TRPs). In such embodiments, the PDSCH rate matching indicator signal associated with the corresponding scheduled PDCCHs may comprise an indication that the PDSCH may not be mapped to resources associated with the entire CORESET. Alternately, in such embodiments, PDSCH rate matching indicator signal associated with the corresponding scheduled PDCCHs may comprise an indication if the overlapping PDSCH may or may not be mapped to resources associated with the CORESET. In some embodiments, when the CORESETs that the UE is already configured to monitor are not included in the rate-matched resource set configuration signal or the PDSCH dynamic rate matching resource set configuration signal or both, the PDSCH rate matching indicator signal may comprise an indication to reuse CORESET resources for overlapping PDSCH. Further, in some embodiments, when the UE is configured with multiple downlink (DL) bandwidth parts (BWPs), the PDSCH dynamic rate matching resource set configuration signal and the rate-matched resource set configuration signal are separately indicated to the UE for each of the one or more DL BWPs configured to the UE.

In a second embodiment, the apparatus 500 is included within the UE 204 in FIG. 2. Therefore, the apparatus 500 is explained herein with reference to the NR communication system 200 in FIG. 2 and the SPDCCH resource set 300 in FIG. 3. All the features associated with the UE 204 in FIG. 2 explained above is also applicable to the apparatus 500 in FIG. 5. In such embodiments, the processing circuit 530 is configured to determine one or more shortened physical downlink control channel (SPDCCH) candidates (e.g., the SPDCCH candidates 306, 308 etc. in FIG. 3b) within a predefined SPDCCH resource set (e.g., the SPDCCH resource set 300 in FIG. 3). In some embodiments, the processing circuit 530 is configured to determine one or more SPDCCH candidates, based on information of an aggregation level of the predefined SPDCCH resource set. In some embodiments, the one or more SPDCCH candidates are utilized by the UE to receive a downlink control information (DCI) from a next generation Node B (gNodeB) (e.g., the gNodeB 202 in FIG. 2) associated therewith for shortened transmission time interval (STTI) operations. In some embodiments, the processing circuit 530 is further configured to receive information (e.g., resource configuration, reference signal type, aggregation level etc.) of the predefined SPDCCH resource set via the transceiver circuitry 510, from the gNodeB, based on radio resource control (RRC) signaling.

In order to determine the resource configuration of the one or more SPDCCH candidates, in some embodiments, the processing circuit 530 is configured to determine one or more shortened control channel elements (SCCEs) (e.g., the SCCE 304 identified by the SCCE number 0 in FIG. 3*a*) associated with each of the one or more SPDCCH candidates, based on an information of a reference signal type and aggregation level of the associated SPDCCH resource set, in accordance with a predefined SPDCCH candidate relation (e.g., the predefined SPDCCH candidate relation given in equation (2) or (3) or (4) above), as explained above with respect to FIG. 2. In some embodiments, determining the one or more SCCEs associated with each of the one or more SPDCCH candidates comprises determining one or more SCCE numbers that respectively identifies the one or more SCCEs. In some embodiments, the processing circuit 530 is further configured to determine a set of shortened resource element groups (SREGs) (e.g., the SREG 302 identified by the SREG number 6 in FIG. 3*b*) associated with each of the one or more SCCEs associated with the one or more SPDCCH candidates, based on an information of the reference signal type the associated SPDCCH resource set, in accordance with a predefined SCCE relation (e.g., the predefined SCCE relation in equation (1) above), as explained above with respect to FIG. 2. In some embodiments, determining the set of SREGs associated with each of the one or more SCCEs comprises determining a set of SREG numbers that respectively identifies the set of SREGs. In some embodiments, determining the set of SREGs associated with the one or more SCCEs associated with the one or more SPDCCH candidates, enables the processing circuit 530 to identify the resource configuration associated with the one or more SPDCCH candidates, thereby enabling the processing circuit 530 to monitor the one or more SPDCCH candidates to receive the DCI (e.g., the DCI 206 in FIG. 2). Upon determining the resource configuration associated with the one or more SPDCCH candidates, in some embodiments, the processing circuit 530 is further configured to receive the DCI on a select SPDCCH candidate from the gNodeB, via the transceiver circuitry 510. In some embodiments, the DCI is mapped to the select SPDCCH candidate in an increasing order of first the SCCE number and then the SREG number.

Figure 6:
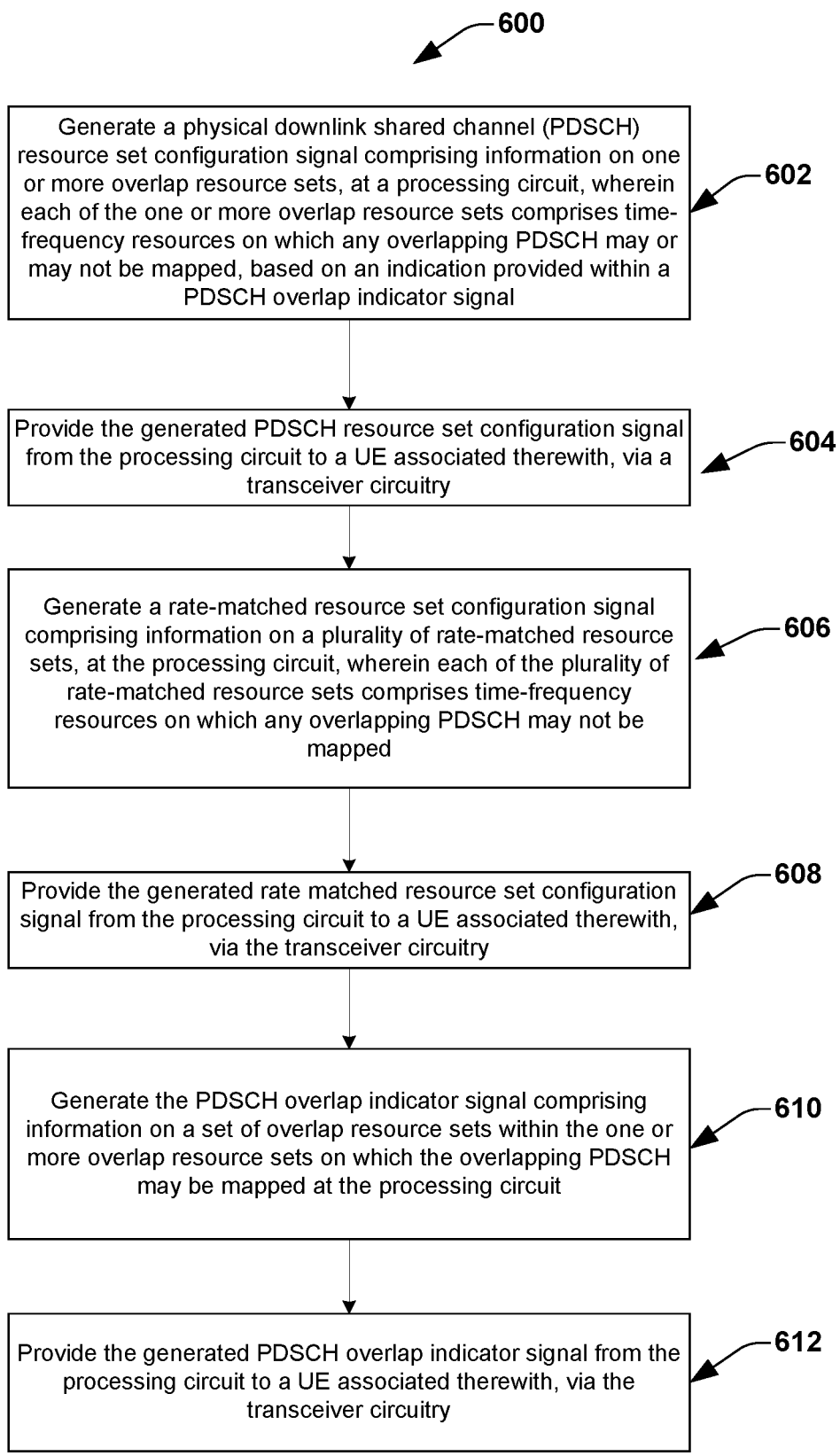
FIG. 6 illustrates a flow chart of a method for a gNodeB in a new radio (NR) system that support resource sharing, according to one embodiment of the disclosure.

FIG. 6 illustrates a flow chart of a method 600 for a gNodeB in a new radio (NR) system that support resource sharing, according to one embodiment of the disclosure. The method 600 is explained herein with reference to the apparatus 400 in FIG. 4. In some embodiments, the apparatus 400 could be included within the gNodeB 102 in FIG. 1. At 602, a physical downlink shared channel (PDSCH) dynamic rate matching resource set configuration signal (e.g., the PDSCH dynamic rate matching resource set configuration signal 108 in FIG. 1) comprising information on one or more overlap resource sets, is generated at the processing circuit 430. In some embodiments, each of the one or more overlap resource sets comprises time-frequency resources on which any overlapping PDSCH may or may not be mapped, based on an indication provided within a PDSCH rate matching indicator signal (e.g., the PDSCH rate matching indicator signal 110 in FIG. 1). At 604, the generated PDSCH dynamic rate matching resource set configuration signal is provided from the processing circuit 430 to a UE (e.g., the UE 104 in FIG. 1) associated therewith, via the transceiver circuitry 410, in order to enable the UE to identify the one or more overlap resource sets.

At 606, a rate-matched resource set configuration signal (e.g., the rate-matched resource set configuration signal 106 in FIG. 1) comprising information on a plurality of rate-matched resource sets, is generated at the processing circuit. In some embodiments, each of the plurality of rate-matched resource sets comprises time-frequency resources on which any overlapping PDSCH may not be mapped. In some embodiments, the one or more overlap resource sets comprised within the PDSCH dynamic rate matching resource set configuration signal is a subset of the plurality of rate-matched resource sets comprised within the rate-matched resource set configuration signal. However, in other embodiments, the rate-matched resource set configuration signal and the PDSCH dynamic rate matching resource set configuration signal may be configured independently with no dependency between the one or more overlap resource sets comprised within the PDSCH dynamic rate matching resource set configuration signal and the plurality of rate-matched resource sets comprised within the rate-matched resource set configuration signal.

In some embodiments, the rate-matched resource configuration signal and the PDSCH dynamic rate matching resource set configuration signal comprise radio resource control (RRC) signals. In some embodiments, the PDSCH dynamic rate matching resource set configuration signal and the rate-matched resource set configuration signal comprises information of one or more of a time-domain granularity, a frequency-domain granularity and an associated periodicity of the resource sets associated therewith. At 608, the generated rate matched resource set configuration signal is provided from the processing circuit to the UE, via the transceiver circuitry 410, in order to enable the UE to identify the plurality of rate-matched resource sets. At 610, the PDSCH rate matching indicator signal comprising information on a set of overlap resource sets within the one or more overlap resource sets (included within the PDSCH dynamic rate matching resource set configuration signal) on which the overlapping PDSCH may be mapped, is generated at the processing circuit 430. At 612, the generated PDSCH rate matching indicator signal is provided from the processing circuit 430 to the UE, via the transceiver circuitry 410.

In some embodiments, the PDSCH rate matching indicator signal comprises a UE-specific downlink control information (DCI) associated with the UE. In some embodiments, the PDSCH rate matching indicator signal or the UE-specific DCI comprises a bitmap field, Rate matching indicator, comprising a plurality of bits (e.g., 1, 2 or 3 bits), wherein each bit corresponds to an overlap resource set identified within the PDSCH dynamic rate matching resource set configuration signal and potentially the UE's own CORESETs if not explicitly configured via the PDSCH dynamic rate matching resource set configuration signal and the rate-matched resource set configuration signal. In some embodiments, with varying number of resource sets, the bit-width of the bitmap field in the DCI may change, leading to multiple DCI format sizes that could potentially increase UE's blind decoding (BD) efforts. To address this, in some embodiments, padding bits are added to the bitmap field indicating dynamic resource sharing so that the DCI format is size-matched to certain candidate values. Alternately, in some embodiments, padding bits are added to the overall DCI format for the same purpose.

In some embodiments, the one or more overlap resource sets comprised within the PDSCH dynamic rate matching resource set configuration signal comprises the UE's own control resource set (CORESET). In such embodiments, the PDSCH rate matching indicator signal may be configured to provide an indication that the PDSCH may be mapped to resources associated with the UE's own CORESET. In some embodiments, the one or more overlap resource sets comprised in the PDSCH dynamic rate matching resource set configuration signal comprises one or more CORESETs associated with the UE, wherein the one or more CORESETs comprise scheduled physical downlink control channel (PDCCH) associated with one or more respective transmission-reception points (TRPs). In such embodiments, the PDSCH rate matching indicator signal may comprise one or more DCIs, each of which may be configured to provide an indication that the PDSCH may be mapped to resources associated with the CORESET carrying the respective PDCCHs. Further, in some embodiments, the one or more overlap resource sets comprised in the PDSCH dynamic rate matching resource set configuration signal comprises a CORESET associated with the UE comprising a plurality of scheduled PDCCHs carrying a respective plurality of DCIs from a plurality of different transmission-reception points (TRPs).

In such embodiments, the PDSCH rate matching indicator signal associated with the corresponding scheduled PDCCHs is configured to provide an indication that the PDSCH may not be mapped to resources associated with the entire CORESET. Alternately, in such embodiments, PDSCH rate matching indicator signal associated with the corresponding scheduled PDCCHs is configured to provide an indication if the overlapping PDSCH may or may not be mapped to resources associated with the CORESET. In some embodiments, when the CORESETs that the UE is already configured to monitor are not included in the rate-matched resource set configuration signal and the PDSCH dynamic rate matching resource set configuration signal, the PDSCH rate matching indicator signal may be used to indicate reuse of CORESET resources for overlapping PDSCH. Further, in some embodiments, when the UE is configured with multiple downlink (DL) bandwidth parts (BWPs), the PDSCH dynamic rate matching resource set configuration signal and the rate-matched resource set configuration signal are separately indicated to the UE for each of the one or more DL BWPs configured to the UE.

Figure 7:
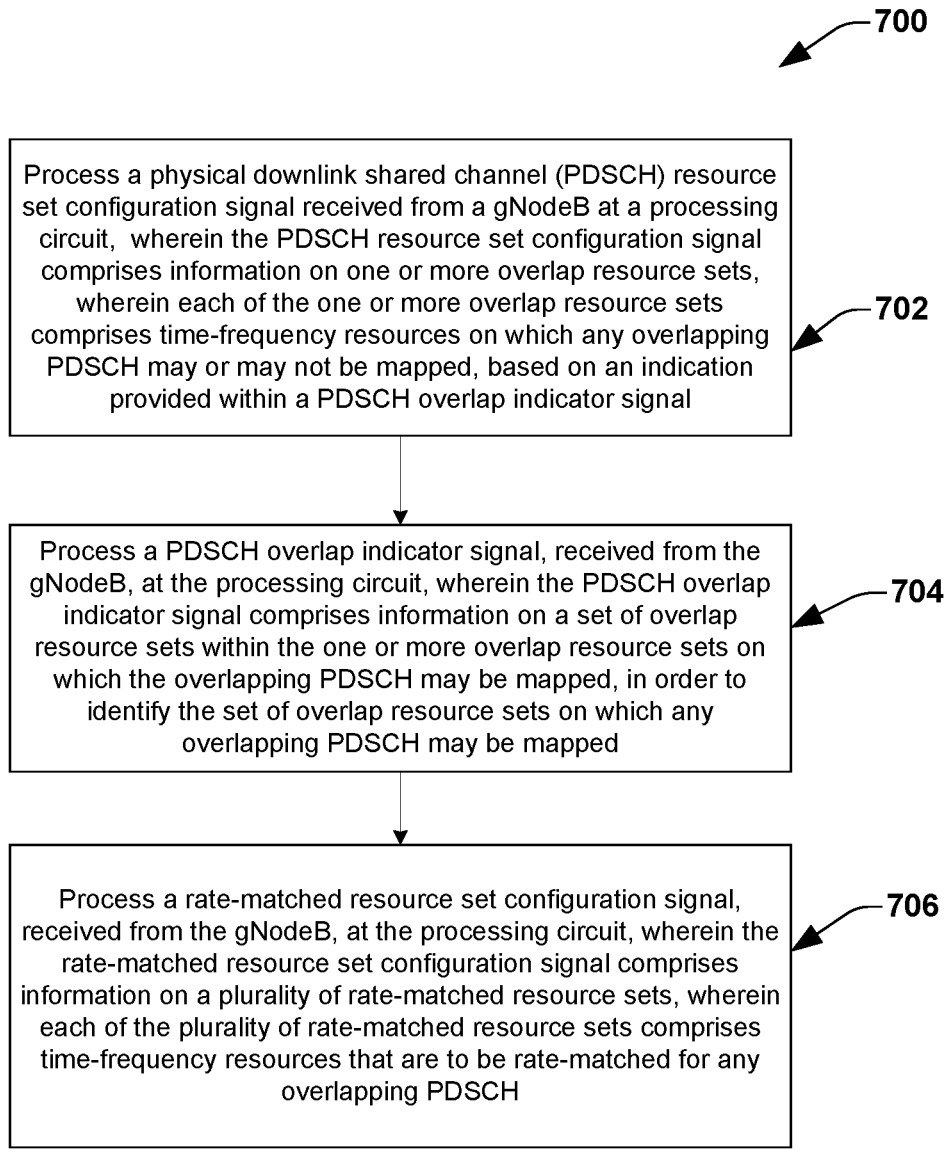
FIG. 7 illustrates a flow chart of a method for a user equipment (UE) in a new radio (NR) system that support resource sharing, according to one embodiment of the disclosure.

FIG. 7 illustrates a flow chart of a method 700 for a user equipment (UE) in a new radio (NR) system that support resource sharing, according to one embodiment of the disclosure. The method 700 is explained herein with reference to the apparatus 500 in FIG. 4. In some embodiments, the apparatus 500 could be included within the UE 104 in FIG. 1. At 702, a physical downlink shared channel (PDSCH) dynamic rate matching resource set configuration signal (e.g., the PDSCH dynamic rate matching resource set configuration signal 108 in FIG. 1) received from a gNodeB (e.g., the gNodeB 102 in FIG. 1), via the transceiver circuitry 510, is processed at the processing circuit 530. In some embodiments, the PDSCH dynamic rate matching resource set configuration signal comprises information on one or more overlap resource sets, wherein each of the one or more overlap resource sets comprises time-frequency resources on which any overlapping PDSCH may or may not be mapped, based on an indication provided within a PDSCH rate matching indicator signal (e.g., the PDSCH rate matching indicator signal 110 in FIG. 1). At 704, the PDSCH rate matching indicator signal, received from the gNodeB, via the transceiver circuitry 510, is processed at the processing circuit 530. In some embodiments, the PDSCH rate matching indicator signal comprises information on a set of overlap resource sets within the one or more overlap resource sets (included within the PDSCH dynamic rate matching resource set configuration signal) on which the overlapping PDSCH may be mapped.

In some embodiments, the PDSCH rate matching indicator signal comprises a UE-specific downlink control information (DCI) associated with the UE. In some embodiments, the PDSCH rate matching indicator signal or the UE-specific DCI comprises a bitmap field, Rate matching indicator, comprising a plurality of bits (e.g., 1, 2 or 3 bits), wherein each bit corresponds to an overlap resource set identified within the PDSCH dynamic rate matching resource set configuration signal and potentially the UE's own CORESETs if not explicitly configured via the PDSCH dynamic rate matching resource set configuration signal and the rate-matched resource set configuration signal. In some embodiments, with varying number of resource sets, the bit-width of the bitmap field in the DCI may change, leading to multiple DCI format sizes that could potentially increase UE's blind decoding (BD) efforts. To address this, in some embodiments, padding bits are added to the bitmap field indicating dynamic resource sharing so that the DCI format is size-matched to certain candidate values. Alternately, in some embodiments, padding bits are added to the overall DCI format for the same purpose.

At 706, a rate-matched resource set configuration signal (e.g., the rate-matched resource set configuration signal 106 in FIG. 1) received from the gNodeB, via the transceiver circuitry 510, is processed at the processing circuit 530. In some embodiments, the rate-matched resource set configuration signal comprises information on a plurality of rate-matched resource sets, wherein each of the plurality of rate-matched resource sets comprises time-frequency resources that are to be rate-matched for any overlapping PDSCH. In some embodiments, the one or more overlap resource sets comprised within the PDSCH dynamic rate matching resource set configuration signal is a subset of the plurality of rate-matched resource sets comprised within the rate-matched resource set configuration signal. However, in other embodiments, the rate-matched resource set configuration signal and the PDSCH dynamic rate matching resource set configuration signal may be configured independently with no dependency between the one or more overlap resource sets comprised within the PDSCH dynamic rate matching resource set configuration signal and the plurality of rate-matched resource sets comprised within the rate-matched resource set configuration signal. In some embodiments, the rate-matched resource configuration signal and the PDSCH dynamic rate matching resource set configuration signal comprises radio resource control (RRC) signals. In some embodiments, the PDSCH dynamic rate matching resource set configuration signal and the rate-matched resource set configuration signal comprises information of one or more of a time-domain granularity, a frequency-domain granularity and an associated periodicity of the resource sets associated therewith.

In some embodiments, the plurality of rate-matched resource sets comprised within the rate-matched resource configuration signal may comprise the UE's own CORESET, however, the PDSCH dynamic rate matching resource set configuration signal may not identify the UE's own CORESET. In such embodiments, the processing circuit 530 is configured to assume that any overlapping PDSCH may be mapped to resources associated with the UE's own CORESET, except the resources of a scheduled physical downlink control channel (PDCCH) carrying the DCI within the UE's own CORESET. In some embodiments, the one or more overlap resource sets comprised within the PDSCH dynamic rate matching resource set configuration signal comprises the UE's own control resource set (CORESET). In such embodiments, the PDSCH rate matching indicator signal may comprise an indication that the PDSCH may be mapped to resources associated with the UE's own CORESET. In such embodiments, the processing circuit 530 is configured to assume that PDSCH may be mapped to resources associated with the UE's own CORESET except the resources of a scheduled physical downlink control channel (PDCCH) carrying the DCI within the UE's own CORESET. In some embodiments, the one or more overlap resource sets comprised in the PDSCH dynamic rate matching resource set configuration signal comprises one or more CORESETs associated with the UE, wherein the one or more CORESETs comprise scheduled physical downlink control channel (PDCCH)s associated with one or more respective transmission-reception points (TRPs). In such embodiments, the PDSCH rate matching indicator signal may comprise one or more DCIs, each of which may be configured to provide an indication that the PDSCH may be mapped to resources associated with the CORESET carrying the respective PDCCHs.

Further, in some embodiments, the one or more overlap resource sets comprised in the PDSCH dynamic rate matching resource set configuration signal comprises a CORESET associated with the UE comprising a plurality of scheduled PDCCHs carrying a respective plurality of DCIs from a plurality of different transmission-reception points (TRPs). In such embodiments, the PDSCH rate matching indicator signal associated with the corresponding scheduled PDCCHs may comprise an indication that the PDSCH may not be mapped to resources associated with the entire CORESET. Alternately, in such embodiments, PDSCH rate matching indicator signal associated with the corresponding scheduled PDCCHs may comprise an indication if the overlapping PDSCH may or may not be mapped to resources associated with the CORESET. In some embodiments, when the CORESETs that the UE is already configured to monitor are not included in the rate-matched resource set configuration signal or the PDSCH dynamic rate matching resource set configuration signal or both, the PDSCH rate matching indicator signal may comprise an indication to reuse CORESET resources for overlapping PDSCH. Further, in some embodiments, when the UE is configured with multiple bandwidth parts (BWPs), the PDSCH dynamic rate matching resource set configuration signal and the rate-matched resource set configuration signal may comprise resource sets associated with one or more configured BWPs of the UE.

Figure 8:
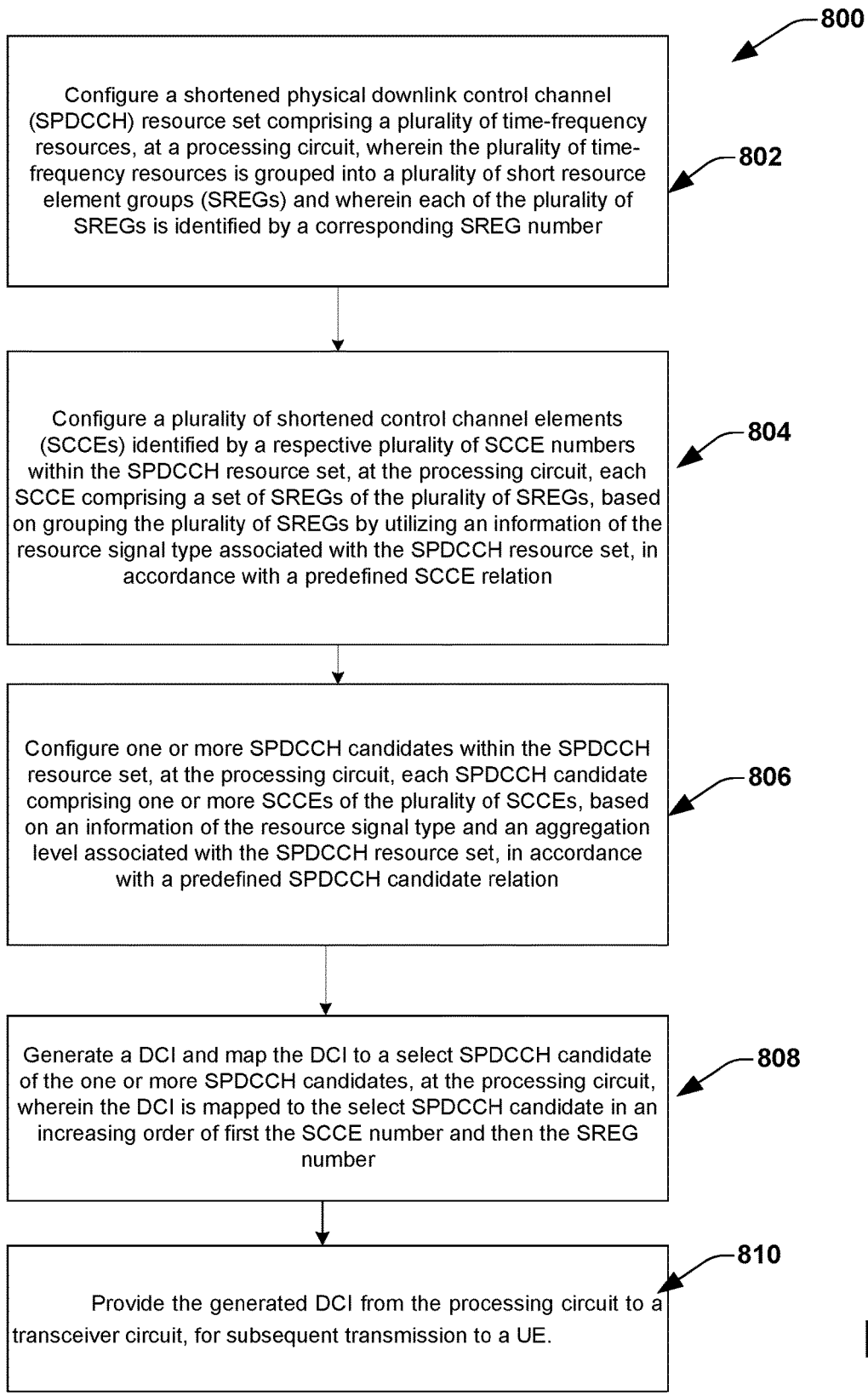
FIG. 8 illustrates a flow chart of a method for a gNodeB in a new radio (NR) system that support shortened transmission time interval (sTTI) operations, according to one embodiment of the disclosure.

FIG. 8 illustrates a flow chart of a method 800 for a gNodeB in a new radio (NR) system that support shortened transmission time interval (sTTI) operations, according to one embodiment of the disclosure. The method 800 is explained herein with reference to the apparatus 400 in FIG. 4. In some embodiments, the apparatus 400 could be included within the gNodeB 202 in FIG. 2. At 802, a shortened physical downlink control channel (SPDCCH) resource set (e.g., the SPDCCH resource set 300 in FIG. 3a) comprising a plurality of time-frequency resources, is configured at the processing circuit 430. In some embodiments, the plurality of time-frequency resources associated with the SPDCCH resource set is grouped into a plurality of short resource element groups (SREGs) (e.g., the SREG 302 identified by the SREG number 6 in FIG. 3a) and wherein each of the plurality of SREGs is identified by a corresponding SREG number. At 804, a plurality of shortened control channel elements (SCCEs) identified by a respective plurality of SCCE numbers (e.g., the SCCE 304 identified by the SCCE number 0 in FIG. 3a) is configured within the SPDCCH resource set, at the processing circuit 430. In some embodiments, each SCCE comprises a set of SREGs of the plurality of SREGs, configured based on grouping the plurality of SREGs by utilizing an information of a resource signal type associated with the SPDCCH resource set, in accordance with a predefined SCCE relation (e.g., the predefined SCCE relation given in equation (1) above).

At 806, one or more SPDCCH candidates are configured within the SPDCCH resource set, at the processing circuit 430. In some embodiments, each SPDCCH candidate comprises one or more SCCEs of the plurality of SCCEs, configured/determined based on an information of the resource signal type and an aggregation level associated with the SPDCCH resource set, in accordance with a predefined SPDCCH candidate relation (e.g., the predefined SPDCCH candidate relation given in equations (2), (3) or (4) above). At 808, a downlink control information (DCI) is generated and mapped to a select SPDCCH candidate of the one or more SPDCCH candidates, at the processing circuit 430. In some embodiments, the DCI is mapped to the select SPDCCH candidate in an increasing order of first the SCCE number and then the SREG number. At 810, the generated DCI is provided from the processing circuit 430 to the transceiver circuit 410, for subsequent transmission to a UE (e.g., the UE 204 in FIG. 2).

Figure 9:
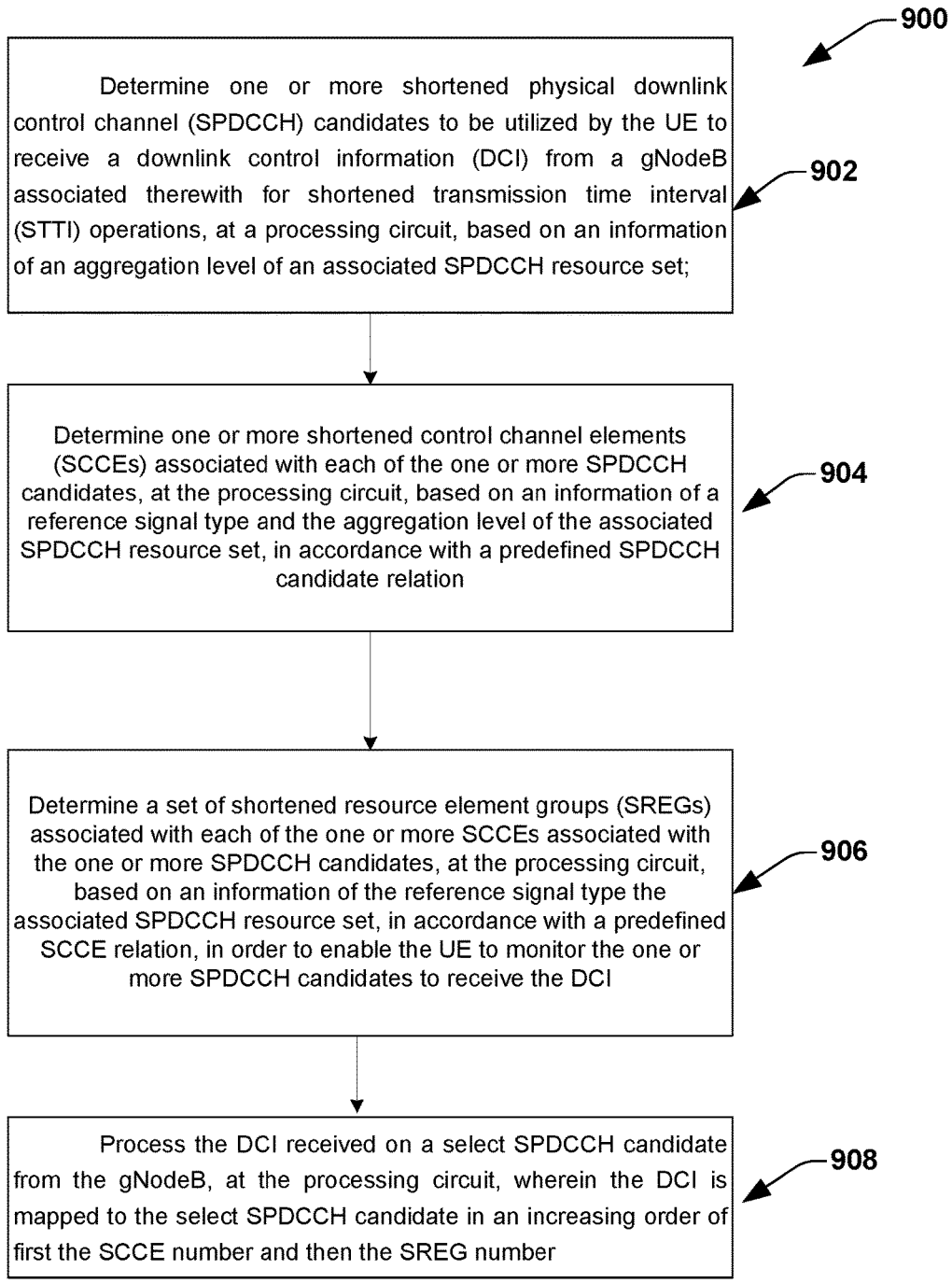
FIG. 9 illustrates a flow chart of a method for a user equipment (UE) in a new radio (NR) system that supports shortened transmission time interval (sTTI) operations, according to one embodiment of the disclosure.

FIG. 9 illustrates a flow chart of a method 900 for a user equipment (UE) in a new radio (NR) system that supports shortened transmission time interval (sTTI) operations, according to one embodiment of the disclosure. The method 900 is explained herein with reference to the apparatus 500 in FIG. 5. In some embodiments, the apparatus 500 could be included within the UE 204 in FIG. 2. At 902, one or more shortened physical downlink control channel (SPDCCH) candidates (e.g., the SPDCCH candidates 306, 308 etc. in FIG. 3a) within a predefined SPDCCH resource set (e.g., the SPDCCH resource set 300 in FIG. 3a), to be utilized by the UE to receive a downlink control information (DCI) (e.g., the DCI 206 in FIG. 2) from a gNodeB (e.g., the gNodeB 202 in FIG. 2) associated therewith for shortened transmission time interval (STTI) operations, is determined at the processing circuit 530. In some embodiments, the processing circuit 530 is configured to determine the one or more SPDCCH candidates based on an information of an aggregation level of the associated SPDCCH resource set. In some embodiments, the one or more SPDCCH candidates is determined at the processing circuit 530 based on determining an SPDCCH candidate number m associated with the one or more SPDCCH candidates, wherein m=0, 1, . . . , $M^L-1$; and $M^L$ is the maximum number of SPDCCH candidates for aggregation level (AL) L in an sPDCCH resource set p, which is configured by higher layers.

At 904, one or more shortened control channel elements (SCCEs) (e.g., the SCCE 304 identified by the SCCE number 0 in FIG. 3a) associated with each of the one or more SPDCCH candidates, is determined at the processing circuit 530. In some embodiments, the processing circuit 530 is configured to determine the one or more SCCEs associated with each of the one or more SPDCCH candidates, based on an information of a reference signal type and the aggregation level of the associated SPDCCH resource set, in accordance with a predefined SPDCCH candidate relation (e.g., the predefined SPDCCH candidate relation given in equations (2), (3) or (4) above). At 906, a set of shortened resource element groups (SREGs) (e.g., the SREG 302 identified by the SREG number 6 in FIG. 3a) associated with each of the one or more SCCEs associated with the one or more SPDCCH candidates, is determined at the processing circuit 530. In some embodiments, the set of SREGs associated with each of the one or more SCCEs associated with the one or more SPDCCH candidates, is determined at the processing circuit 530, based on an information of the reference signal type the associated SPDCCH resource set, in accordance with a predefined SCCE relation (e.g., the predefined SCCE relation given in equation (1) above). At 908, the DCI received on a select SPDCCH candidate of the one or more SPDCCH candidates from the gNodeB, via an RF interface, is processed at the processing circuit 530, in order to decode information associated with the DCI. In some embodiments, the DCI is mapped to the select SPDCCH candidate in an increasing order of first the SCCE number and then the SREG number.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Figure 10:
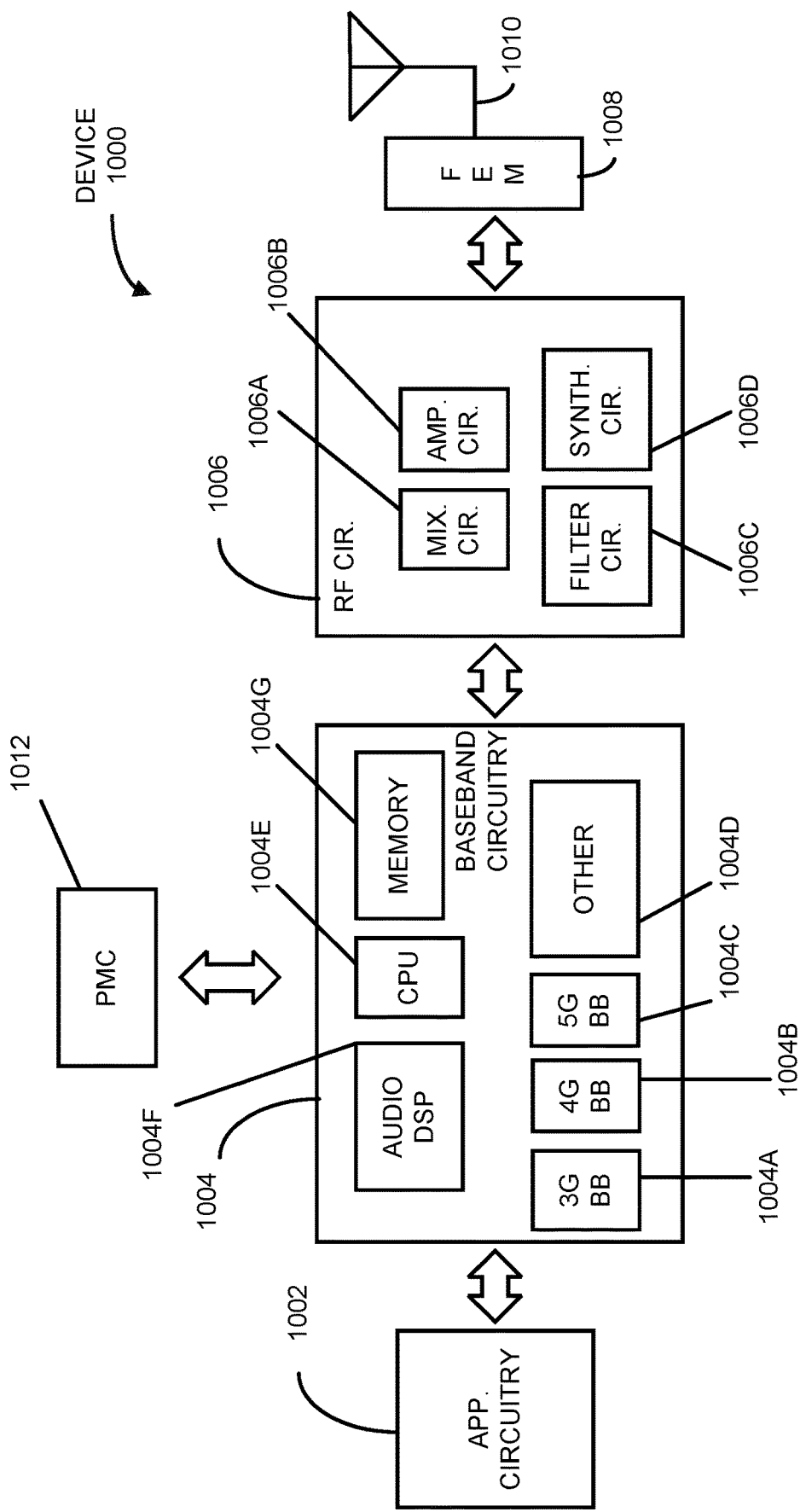
FIG. 10 illustrates example components of a device, in accordance with some embodiments.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004A, a fourth generation (4G) baseband processor 1004B, a fifth generation (5G) baseband processor 1004C, or other baseband processor(s) 1004D for other existing generations, generations in development or to be developed in the future (e.g., second generation (2G), si13h generation (6G), etc.). The baseband circuitry 1004 (e.g., one or more of baseband processors 1004A-D) may handle various radio control functions that enable communication with one or more radio networks via the RF circuitry 1006. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004F. The audio DSP(s) 1004F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 13 12 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
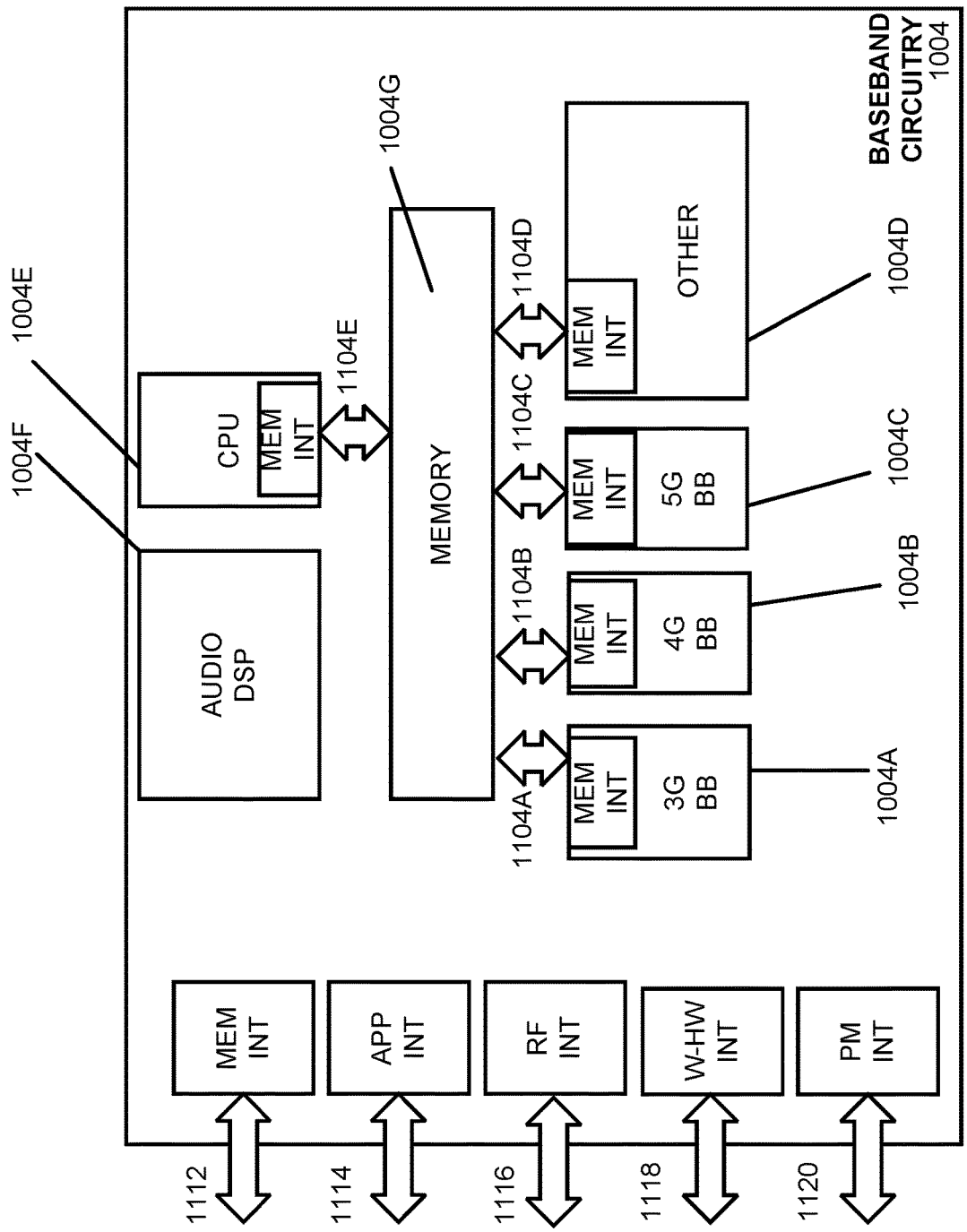
FIG. 11 illustrates example interfaces of baseband circuitry in accordance with some embodiments.

FIG. 11 illustrates example interfaces of baseband circuitry in accordance with some embodiments. As discussed above, the baseband circuitry 1004 of FIG. 10 may comprise processors 1004A-1004E and a memory 1004G utilized by said processors. Each of the processors 1004A-1004E may include a memory interface, 1104A-1104E, respectively, to send/receive data to/from the memory 1004G.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a next generation Node B (gNodeB) associated with a new radio (NR) communication system, comprising a processing circuit configured to generate a physical downlink shared channel (PDSCH) dynamic rate matching resource set configuration signal comprising information on one or more overlap resource sets, wherein each of the one or more overlap resource sets comprises time-frequency resources on which any overlapping PDSCH may or may not be mapped, based on an indication provided within a PDSCH rate matching indicator signal; and a radio frequency (RF) interface, configured to provide the generated PDSCH dynamic rate matching resource set configuration signal, to an RF circuitry, in order to subsequently provide the PDSCH dynamic rate matching resource set configuration signal to a user equipment (UE), in order to enable the UE to identify the one or more overlap resource sets.

Example 2 is an apparatus, including the subject matter of example 1, wherein the processing circuit is further configured to generate the PDSCH rate matching indicator signal comprising information on a set of overlap resource sets within the one or more overlap resource sets on which the overlapping PDSCH may be mapped; and provide the generated PDSCH rate matching indicator signal to the UE.

Example 3 is an apparatus, including the subject matter of examples 1-2, including or omitting elements, wherein the processing circuit is further configured to generate a rate-matched resource set configuration signal comprising information on a plurality of rate-matched resource sets, wherein each of the plurality of rate-matched resource sets comprises time-frequency resources on which any overlapping PDSCH may not be mapped; and provide the generated rate-matched resource set configuration signal to the UE.

Example 4 is an apparatus, including the subject matter of examples 1-3, including or omitting elements, wherein the one or more overlap resource sets comprised within the PDSCH dynamic rate matching resource set configuration signal is a subset of the plurality of rate-matched resource sets comprised within the rate-matched resource set configuration signal.

Example 5 is an apparatus, including the subject matter of examples 1-4, including or omitting elements, wherein the one or more overlap resource sets comprised within the PDSCH dynamic rate matching resource set configuration signal comprises one or more control resource sets (CORESETs) that are configured to the UE.

Example 6 is an apparatus, including the subject matter of examples 1-5, including or omitting elements, wherein the plurality of rate-matched resource sets comprised within the rate-matched resource set configuration signal comprises one or more control resource sets (CORESETs) that are configured to the UE.

Example 7 is an apparatus, including the subject matter of examples 1-6, including or omitting elements, wherein the PDSCH rate matching indicator signal comprises a UE-specific downlink control information (DCI) associated with the UE.

Example 8 is an apparatus, including the subject matter of examples 1-7, including or omitting elements, wherein the one or more CORESETs configured to the UE comprises one or more CORESETs for physical downlink control channel (PDCCH) monitoring associated with one or more respective transmission-reception points (TRPs).

Example 9 is an apparatus, including the subject matter of examples 1-8, including or omitting elements, wherein, when the one or more overlap resource sets comprised in the PDSCH dynamic rate matching resource set configuration signal comprises a CORESET configured to the UE comprising a plurality of scheduled PDCCHs carrying a respective plurality of DCIs from a plurality of different transmission-reception points (TRPs), the PDSCH rate matching indicator signal associated with the corresponding scheduled PDCCHs is configured to provide an indication that the PDSCH may not be mapped to resources associated with the entire CORESET.

Example 10 is an apparatus, including the subject matter of examples 1-9, including or omitting elements, when the UE is configured with one or more downlink (DL) bandwidth parts (BWPs), the PDSCH dynamic rate matching resource set configuration signal and the rate-matched resource set configuration signal are separately indicated to the UE for each of the one or more DL BWPs configured to the UE.

Example 11 is an apparatus, including the subject matter of examples 1-10, including or omitting elements, wherein the PDSCH dynamic rate matching resource set configuration signal and the rate-matched resource set configuration signal comprises information of contiguous or non-contiguous physical resource blocks (PRBs) of the associated resource sets, in order to indicate the frequency-domain granularity of the associated resource sets.

Example 12 is an apparatus, including the subject matter of examples 1-11, including or omitting elements, wherein the PDSCH dynamic rate matching resource set configuration signal and the rate-matched resource set configuration signal comprises a bitmap of symbol indices of the associated resource sets, in order to indicate the time-domain granularity of the associated resource sets.

Example 13 is an apparatus, including the subject matter of examples 1-12, including or omitting elements, wherein the resource sets associated with the PDSCH dynamic rate matching resource set configuration signal and the rate-matched resource set configuration signal are configured with an associated periodicity, wherein the associated periodicity comprises one or more of periodicities in multiples of slots or symbols, or periodicities associated with the configuration of CORESETs.

Example 14 is an apparatus, including the subject matter of examples 1-13, including or omitting elements. The apparatus of claim 1, wherein the PDSCH dynamic rate matching resource set configuration signal comprises a UE-specific radio resource control (RRC) signal.

Example 15 is an apparatus, including the subject matter of examples 1-14, including or omitting elements, wherein the rate-matched resource set configuration signal comprises a UE-specific radio resource control (RRC) signal or a cell-specific RRC signal, wherein the cell-specific RRC signal may include one or more of Remaining Minimum System Information (RMSI) and Other System Information (OSI).

Example 16 is an apparatus configured to be employed in a user equipment (UE) associated with a new radio (NR) communication system, comprising a radio frequency (RF) interface, configured to receive a physical downlink shared channel (PDSCH) dynamic rate matching resource set configuration signal, from a next generation Node B (gNodeB) associated therewith, wherein the PDSCH dynamic rate matching resource set configuration signal comprises information on one or more overlap resource sets, wherein each of the one or more overlap resource sets comprises time-frequency resources on which any overlapping PDSCH may or may not be mapped, based on an indication provided within a PDSCH rate matching indicator signal; and a processing circuit configured to process the PDSCH dynamic rate matching resource set configuration signal, in order to identify the one or more overlap resource sets.

Example 17 is an apparatus, including the subject matter of example 16, wherein the processing circuit is further configured to process the PDSCH rate matching indicator signal, received from the gNodeB via the RF interface, wherein the PDSCH rate matching indicator signal comprises information on a set of overlap resource sets within the one or more overlap resource sets on which the overlapping PDSCH may be mapped, in order to identify the set of overlap resource sets on which any overlapping PDSCH may be mapped.

Example 18 is an apparatus, including the subject matter of examples 16-17, including or omitting elements, wherein the processing circuit is further configured to process a rate-matched resource set configuration signal, received from the gNodeB via the RF interface, wherein the rate-matched resource set configuration signal comprises information on a plurality of rate-matched resource sets, wherein each of the plurality of rate-matched resource sets comprises time-frequency resources on which any overlapping PDSCH may not be mapped, in order to identify the plurality of rate-matched resource sets.

Example 19 is an apparatus, including the subject matter of examples 16-18, including or omitting elements, wherein the one or more overlap resource sets comprised within the PDSCH dynamic rate matching resource set configuration signal is a subset of the plurality of rate-matched resource sets comprised within the rate-matched resource set configuration signal.

Example 20 is an apparatus, including the subject matter of examples 16-19, including or omitting elements, wherein, when a CORESET configured to the UE is included within the one or more overlap resource sets of the PDSCH dynamic rate matching resource set configuration signal and the PDSCH rate matching indicator signal comprises an indication that an overlapping PDSCH may be mapped to resources associated with the UE's own CORESET, the processing circuit is configured to assume that the overlapping PDSCH may be mapped to resources associated with the UE's own CORESET, except the resources of a physical downlink control channel (PDCCH) carrying the scheduling DCI for the overlapping PDSCH within the CORESET.

Example 21 is an apparatus configured to be employed in a next generation Node B (gNodeB) associated with a new radio (NR) communication system, comprising a processing circuit configured to configure a shortened physical downlink control channel (SPDCCH) resource set comprising a plurality of time-frequency resources, wherein the plurality of time-frequency resources is grouped into a plurality of short resource element groups (SREGs) and wherein each of the plurality of SREGs is identified by a corresponding SREG number; configure a plurality of shortened control channel elements (SCCEs) identified by a respective plurality of SCCE numbers within the SPDCCH resource set, each SCCE comprising a set of SREGs of the plurality of SREGs, based on grouping the plurality of SREGs by utilizing an information of the resource signal type associated with the SPDCCH resource set, in accordance with a predefined SCCE relation; and configure one or more SPDCCH candidates within the SPDCCH resource set, each SPDCCH candidate comprising one or more SCCEs of the plurality of SCCEs, based on an information of the resource signal type and an aggregation level associated with the SPDCCH resource set, in accordance with a predefined SPDCCH candidate relation, wherein the one or more SPDCCH candidates are to be utilized by the gNodeB to transmit downlink control information (DCI) to a user equipment (UE) associated therewith for shortened transmission time interval (STTI) operations.

Example 22 is an apparatus, including the subject matter of example 21, wherein a number of SREGs within the set of SREGs associated with each SCCE, $N_{REG}^{SCCE}$, is a function of the resource signal type associated with the SPDCCH resource set or a number of symbols associated with the SPDCCH resource set or both.

Example 23 is an apparatus, including the subject matter of examples 21-22, including or omitting elements, wherein $N_{REG}^{SCCE}=4$, for cell specific reference signal (CRS) based SPDCCH transmission and for demodulation reference signal (DMRS) based SPDCCH transmission when the SPDCCH resource set spans 2 symbols.

Example 24 is an apparatus, including the subject matter of examples 21-23, including or omitting elements, wherein, for demodulation reference signal (DMRS) based SPDCCH transmission when the SPDCCH resource set spans 3 symbols, $N_{REG}^{SCCE}$=3, when SREG bundling is not applied, and $N_{REG}^{SCCE}$=6, when SREG bundling is applied.

Example 25 is an apparatus, including the subject matter of examples 21-24, including or omitting elements, wherein, for demodulation reference signal (DMRS) based SPDCCH transmission, the plurality of SREGs are numbered from 0-$N_{SREG}$-1, in an increasing order of first time and then frequency, and for cell specific reference signal (CRS) based SPDCCH transmission, the plurality of SREGs are numbered from 0-$N_{SREG}$-1, in an increasing order of first frequency and then time, wherein the $N_{SREG}$ comprises a number of SREGs within the SPDCCH resource set.

Example 26 is an apparatus, including the subject matter of examples 21-25, including or omitting elements, wherein the processing circuit is further configured to generate the DCI and map the DCI to a select SPDCCH candidate of the one or more SPDCCH candidates, wherein the DCI is mapped to the select SPDCCH candidate in an increasing order of first the SCCE number and then the SREG number; and provide the generated DCI to a radio frequency (RF) circuitry, via an RF interface, for subsequent transmission to the UE.

Example 27 is an apparatus configured to be employed in a user equipment (UE) associated with a new radio (NR) communication system, comprising a processing circuit configured to determine one or more shortened physical downlink control channel (SPDCCH) candidates to be utilized by the UE to receive a downlink control information (DCI) from a next generation Node B (gNodeB) associated therewith for shortened transmission time interval (STTI) operations, based on an information of an aggregation level of an associated SPDCCH resource set; determine one or more shortened control channel elements (SCCEs) associated with each of the one or more SPDCCH candidates, based on an information of a reference signal type and the aggregation level of the associated SPDCCH resource set, in accordance with a predefined SPDCCH candidate relation; and determine a set of shortened resource element groups (SREGs) associated with each of the one or more SCCEs associated with the one or more SPDCCH candidates, based on an information of the reference signal type the associated SPDCCH resource set, in accordance with a predefined SCCE relation, in order to enable the UE to monitor the one or more SPDCCH candidates to receive the DCI.

Example 28 is an apparatus, including the subject matter of example 27, wherein determining the one or more SCCEs associated with each of the one or more SPDCCH candidates comprises determining one or more SCCE numbers that respectively identifies the one or more SCCEs.

Example 29 is an apparatus, including the subject matter of examples 27-28, including or omitting elements, wherein determining the set of SREGs associated with each of the one or more SCCEs comprises determining a set of SREG numbers that respectively identifies the set of SREGs.

Example 30 is an apparatus, including the subject matter of examples 27-29, including or omitting elements, wherein a number of SREGs within the set of SREGs associated with each of the one or more SCCEs, $N_{REG}^{SCCE}$, is a function of the resource signal type associated with the SPDCCH resource set or a number of symbols associated with the SPDCCH resource set or both.

Example 31 is an apparatus, including the subject matter of examples 27-30, including or omitting elements, wherein $N_{REG}^{SCCE}$=4, for cell specific reference signal (CRS) based SPDCCH transmission and for demodulation reference signal (DMRS) based SPDCCH transmission when the SPDCCH resource set spans 2 symbols.

Example 32 is an apparatus, including the subject matter of examples 27-31, including or omitting elements, wherein, for demodulation reference signal (DMRS) based SPDCCH transmission when the SPDCCH resource set spans 3 symbols, $N_{REG}^{SCCE}$=3, when SREG bundling is not applied, and $N_{REG}^{SCCE}$=6, when SREG bundling is applied.

Example 33 is an apparatus, including the subject matter of examples 27-32, including or omitting elements, wherein the processing circuit is further configured to receive the DCI on a select SPDCCH candidate of the one or more SPDCCH candidates from the gNodeB, via an RF interface, wherein the DCI is mapped to the select SPDCCH candidate in an increasing order of first the SCCE number and then the SREG number; and process the DCI, in order to decode information associated with the DCI.

Various illustrative logics, logical blocks, modules, and circuits described in connection with aspects disclosed herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. An apparatus configured to be employed in a next generation Node B (gNodeB) associated with a new radio (NR) communication system, comprising:
a processing circuit configured to generate a physical downlink shared channel (PDSCH) dynamic rate matching resource set configuration signal comprising information on one or more overlap resource sets, wherein each of the one or more overlap resource sets comprises time-frequency resources on which any overlapping PDSCH may or may not be mapped, based on an indication provided within a PDSCH rate matching indicator signal; and a radio frequency (RF) interface, configured to provide the generated PDSCH dynamic rate matching resource set configuration signal, to an RF circuitry, in order to subsequently provide the PDSCH dynamic rate matching resource set configuration signal to a user equipment (UE), in order to enable the UE to identify the one or more overlap resource sets.

2. The apparatus of claim 1, wherein the processing circuit is further configured to:

generate the PDSCH rate matching indicator signal comprising information on a set of overlap resource sets within the one or more overlap resource sets on which the overlapping PDSCH may be mapped; and provide the generated PDSCH rate matching indicator signal to the UE.

3. The apparatus of claim 2, wherein the one or more overlap resource sets comprised within the PDSCH dynamic rate matching resource set configuration signal comprises one or more control resource sets (CORESETs) that are configured to the UE.

4. The apparatus of claim 3, wherein the one or more CORESETs configured to the UE comprises one or more CORESETs for physical downlink control channel (PDCCH) monitoring associated with one or more respective transmission-reception points (TRPs).

5. The apparatus of claim 2, wherein the PDSCH rate matching indicator signal comprises a UE-specific downlink control information (DCI) associated with the UE.

6. The apparatus of claim 2, wherein, when the one or more overlap resource sets comprised in the PDSCH dynamic rate matching resource set configuration signal comprises a CORESET configured to the UE comprising a plurality of scheduled PDCCHs carrying a respective plurality of Das from a plurality of different transmission-reception points (TRPs), the PDSCH rate matching indicator signal associated with the corresponding scheduled PDCCHs is configured to provide an indication that the PDSCH may not be mapped to resources associated with the entire CORESET.

7. The apparatus of claim 1, wherein the processing circuit is further configured to:

generate a rate-matched resource set configuration signal comprising information on a plurality of rate-matched resource sets, wherein each of the plurality of rate-matched resource sets comprises time-frequency resources on which any overlapping PDSCH may not be mapped; and provide the generated rate-matched resource set configuration signal to the UE.

8. The apparatus of claim 7, wherein the one or more overlap resource sets comprised within the PDSCH dynamic rate matching resource set configuration signal is a subset of the plurality of rate-matched resource sets comprised within the rate-matched resource set configuration signal.

9. The apparatus of claim 7, wherein the plurality of rate-matched resource sets comprised within the rate-matched resource set configuration signal comprises one or more control resource sets (CORESETs) that are configured to the UE.

10. The apparatus of claim 7, when the UE is configured with one or more downlink (DL) bandwidth parts (BWPs), the PDSCH dynamic rate matching resource set configuration signal and the rate-matched resource set configuration signal are separately indicated to the UE for each of the one or more DL BWPs configured to the UE.

11. The apparatus of claim 7, wherein the PDSCH dynamic rate matching resource set configuration signal and the rate-matched resource set configuration signal comprises information of contiguous or non-contiguous physical resource blocks (PRBs) of the associated resource sets, in order to indicate the frequency-domain granularity of the associated resource sets.

12. The apparatus of claim 7, wherein the PDSCH dynamic rate matching resource set configuration signal and the rate-matched resource set configuration signal comprises a bitmap of symbol indices of the associated resource sets, in order to indicate the time-domain granularity of the associated resource sets.

13. The apparatus of claim 7, wherein the resource sets associated with the PDSCH dynamic rate matching resource set configuration signal and the rate-matched resource set configuration signal are configured with an associated periodicity, wherein the associated periodicity comprises one or more of periodicities in multiples of slots or symbols, or periodicities associated with the configuration of CORESETs.

14. The apparatus of claim 7, wherein the rate-matched resource set configuration signal comprises a UE-specific radio resource control (RRC) signal or a cell-specific RRC signal, wherein the cell-specific RRC signal may include one or more of Remaining Minimum System Information (RMSI) and Other System Information (OSI).

15. The apparatus of claim 1, wherein the PDSCH dynamic rate matching resource set configuration signal comprises a UE-specific radio resource control (RRC) signal.

16. An apparatus configured to be employed in a user equipment (UE) associated with a new radio (NR) communication system, comprising:

a radio frequency (RF) interface, configured to receive a physical downlink shared channel (PDSCH) dynamic rate matching resource set configuration signal, from a next generation Node B (gNodeB) associated therewith, wherein the PDSCH dynamic rate matching resource set configuration signal comprises information on one or more overlap resource sets, wherein each of the one or more overlap resource sets comprises time-frequency resources on which any overlapping PDSCH may or may not be mapped, based on an indication provided within a PDSCH rate matching indicator signal; and a processing circuit configured to process the PDSCH dynamic rate matching resource set configuration signal, in order to identify the one or more overlap resource sets.

17. The apparatus of claim 16, wherein the processing circuit is further configured to process the PDSCH rate matching indicator signal, received from the gNodeB via the RF interface, wherein the PDSCH rate matching indicator signal comprises information on a set of overlap resource sets within the one or more overlap resource sets on which the overlapping PDSCH may be mapped, in order to identify the set of overlap resource sets on which any overlapping PDSCH may be mapped.

18. The apparatus of claim 17, wherein, when a CORESET configured to the UE is included within the one or more overlap resource sets of the PDSCH dynamic rate matching resource set configuration signal and the PDSCH rate matching indicator signal comprises an indication that an overlapping PDSCH may be mapped to resources associated with the UE's own CORESET, the processing circuit is configured to assume that the overlapping PDSCH may be mapped to resources associated with the UE's own CORESET, except the resources of a physical downlink control channel (PDCCH) carrying the scheduling DCI for the overlapping PDSCH within the CORESET.

19. The apparatus of claim 16, wherein the processing circuit is further configured to process a rate-matched resource set configuration signal, received from the gNodeB via the RF interface, wherein the rate-matched resource set configuration signal comprises information on a plurality of rate-matched resource sets, wherein each of the plurality of rate-matched resource sets comprises time-frequency resources on which any overlapping PDSCH may not be mapped, in order to identify the plurality of rate-matched resource sets.

20. The apparatus of claim 19, wherein the one or more overlap resource sets comprised within the PDSCH dynamic rate matching resource set configuration signal is a subset of the plurality of rate-matched resource sets comprised within the rate-matched resource set configuration signal.

\* \* \* \* \*